US010274696B2

(12) United States Patent
Chou et al.

(10) Patent No.: US 10,274,696 B2
(45) Date of Patent: Apr. 30, 2019

(54) OPTICAL SYSTEMS AND HEAD MOUNTED DISPLAYS

(71) Applicant: RAZER (ASIA-PACIFIC) PTE. LTD., Singapore (SG)

(72) Inventors: Cheng Hsiung Chou, Taipei (TW); Michael Chung-Ta Chiang, Emeryville, CA (US); Chang Sern Gwee, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 48 days.

(21) Appl. No.: 15/540,471

(22) PCT Filed: Dec. 2, 2015

(86) PCT No.: PCT/SG2015/050481
§ 371 (c)(1),
(2) Date: Jun. 28, 2017

(87) PCT Pub. No.: WO2016/108753
PCT Pub. Date: Jul. 7, 2016

(65) Prior Publication Data

US 2018/0335605 A1 Nov. 22, 2018

Related U.S. Application Data

(60) Provisional application No. 62/097,873, filed on Dec. 30, 2014.

(51) Int. Cl.
*G09G 5/00* (2006.01)
*G02B 7/12* (2006.01)
(Continued)

(52) U.S. Cl.
CPC ............... *G02B 7/12* (2013.01); *G02B 7/021* (2013.01); *G02B 7/023* (2013.01);
(Continued)

(58) Field of Classification Search
CPC ........ G06F 3/012; G06F 3/013; G06F 3/0304; G06F 3/042; G06F 3/0421; G06F 3/0428
See application file for complete search history.

(56) References Cited

U.S. PATENT DOCUMENTS 5,815,126 A 9/1998 Fan et al.
6,369,952 B1 4/2002 Rallison et al.
(Continued)

FOREIGN PATENT DOCUMENTS

CN 2724027 Y 9/2005
CN 2819243 Y 9/2006
(Continued)

OTHER PUBLICATIONS

Extended European Search Report dated Jan. 26, 2018 in related European Patent Application No. 15875798.9, 7 pages.
(Continued)

*Primary Examiner* — Vijay Shankar
(74) *Attorney, Agent, or Firm* — Polsinelli PC

(57) ABSTRACT

According to various embodiments, an optical system may be provided. The optical system may include: a first optical arrangement having a first optical axis; a second optical arrangement having a second optical axis at least substantially parallel to the first optical axis; and a first movement member; wherein the first movement member is configured to move the first optical arrangement with respect to the second optical arrangement in a first direction and a second direction; wherein the first direction is a direction at least substantially parallel to the first optical axis; and wherein the second direction is a direction at least substantially perpendicular to the first optical axis.

19 Claims, 23 Drawing Sheets

(51) Int. Cl.
*G02B 27/01* (2006.01)
*G02B 7/02* (2006.01)

(52) U.S. Cl.
CPC ...... *G02B 27/0176* (2013.01); *G02B 27/0179* (2013.01); *G02B 2027/0161* (2013.01); *G02B 2027/0181* (2013.01)

(56) References Cited

U.S. PATENT DOCUMENTS

| | | | | |
|---|---|---|---|---|
| 6,452,572 | B1 * | 9/2002 | Fan | G02B 27/017 345/7 |
| 6,538,624 | B1 | 3/2003 | Karasawa et al. | |
| 8,605,008 | B1 | 12/2013 | Prest et al. | |
| 2009/0180194 | A1 | 7/2009 | Yamaguchi et al. | |
| 2013/0069850 | A1 | 3/2013 | Mukawa et al. | |
| 2014/0098009 | A1 | 4/2014 | Prest et al. | |
| 2014/0266986 | A1 | 9/2014 | Magyari | |
| 2016/0041394 | A1 * | 2/2016 | Tanaka | G02B 27/0172 359/630 |

FOREIGN PATENT DOCUMENTS

| | | | |
|---|---|---|---|
| CN | 201247347 | Y | 5/2009 |
| EP | 2985651 | A1 | 2/2016 |
| JP | 2013-175945 | A | 9/2013 |
| KR | 2002-0052657 | A | 7/2002 |
| TW | 201219829 | A | 5/2012 |
| WO | 2014/167934 | A1 | 10/2014 |

OTHER PUBLICATIONS

Office Action dated May 18, 2018, 17 pages including translation, for the corresponding Chinese Patent Application No. 201580075355.X.

Office Action dated Oct. 5, 2018, 18 pages including translation, for the corresponding Taiwanese Patent Application No. 104135405.

* cited by examiner

OPTICAL SYSTEMS AND HEAD MOUNTED DISPLAYS

CROSS-REFERENCE TO RELATED APPLICATIONS

The present application claims the benefit of the U.S. provisional patent application No. 62/097,873 filed on 30 Dec. 2014, the entire contents of which are incorporated herein by reference for all purposes.

TECHNICAL FIELD

Various embodiments generally relate to optical systems and head mounted displays.

BACKGROUND

Head mounted display may be used by users of various sizes. As such, there may be a need for head mounted displays which can comfortably be used by users of various sizes.

SUMMARY OF THE INVENTION

According to various embodiments, an optical system may be provided. The optical system may include: a first optical arrangement having a first optical axis; a second optical arrangement having a second optical axis at least substantially parallel to the first optical axis; and a first movement member; wherein the first movement member is configured to move the first optical arrangement with respect to the second optical arrangement in a first direction and a second direction; wherein the first direction is a direction at least substantially parallel to the first optical axis; and wherein the second direction is a direction at least substantially perpendicular to the first optical axis.

According to various embodiments, a head mounted display may be provided. The head mounted display may include an optical system (for example an optical system like described above).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1A:
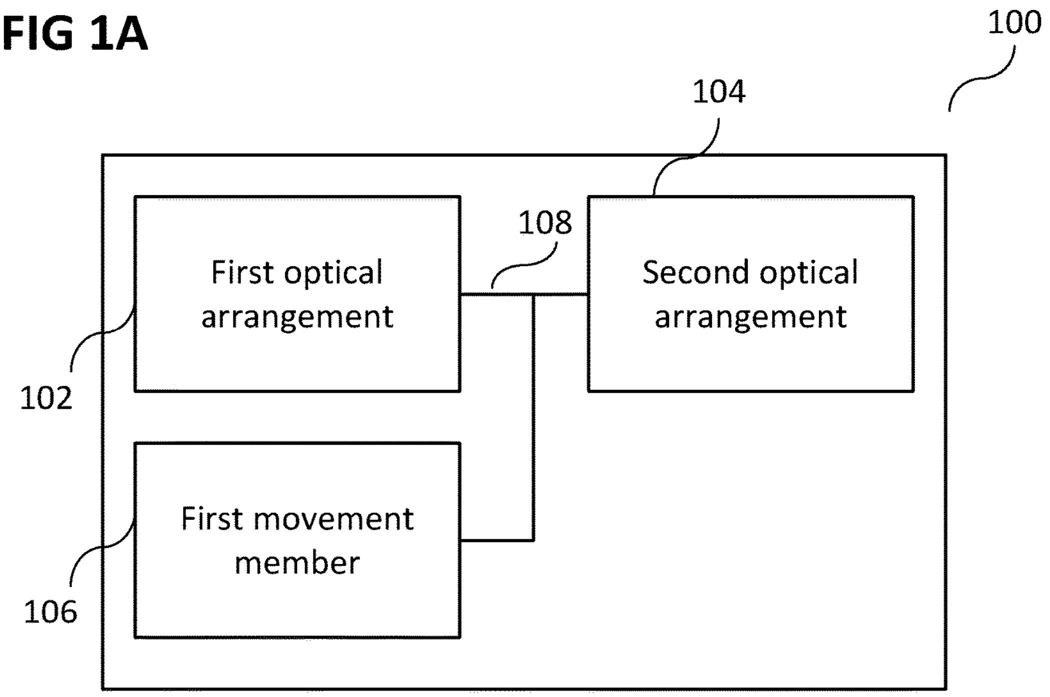
FIG. 1A and FIG. 1B show optical systems according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Head mounted display may be used by users of various sizes. According to various embodiments, head mounted displays may be provided which may comfortably be used by users of various sizes.

For HMDs or personal display systems with optical modules (optical modules for left and right eyes), adjustment of the optical module is currently provided as a means to adjust the optical module either mechanically or electromechanically in order to account for limitations of the user's eyesight, for example by glasses or contact lens, or for adjustment of the spacing between the optical modules to account for spacing between a user's eyes for viewing of images. For example, some HMDs allow the user to adjust interpupillary distance, i.e. the distance between the pupils of the wearer's eyes so that it provides more comfort to the user's eyes. Some HMDs also allow the user to make focal adjustments to adjust the diopter to an appropriate level to cover users who are nearsighted or farsighted. HMDs that provide solutions to adjust interpupillary distance and to make diopter corrections are not ergonomic enough to provide comfort for the user's eyes. According to various embodiments, this problem is solved by providing for independent adjustment of the optical module in two axes of movement.

According to various embodiments, an adjustment assembly for movement of individual optical modules in two axes to account for a user's eyesight limitation and spacing of the eyes for a Head Mounted Display (HMD) may be provided.

FIG. 1A shows an optical system 100 according to various embodiments. The optical system 100 may include a first optical arrangement 102 having a first optical axis (for example an axis along which a user looks through the first optical arrangement with one of his eyes). The optical system 100 may further include a second optical arrangement 104 having a second optical axis (for example an axis along which a user looks through the first optical arrangement with another one of his eyes) at least substantially parallel to the first optical axis. The optical system 100 may further include a first movement member 106. The first movement member 106 may be configured to move (for example when moved by a user of the optical system 100) the first optical arrangement with respect to the second optical arrangement in a first direction and a second direction. The first direction may be a direction at least substantially parallel to the first optical axis. For example, the movement of the first optical arrangement along the first optical axis allows the user to make focal adjustments to correct for nearsightedness (myopia) or farsightedness (hyperopia). To correct for nearsightedness, the first optical arrangement will need to be moved along the first optical axis to be closer or further away from the user's eyes. The second direction may be a direction at least substantially perpendicular to the first optical axis. For example, the movement of the first optical arrangement along the direction perpendicular to the first optical axis allows the user to make adjustments to the inter-pupillary distance between the user's eyes. The first optical arrangement 102, the second optical arrangement 104, and the first movement member 106 may be connected, for example mechanically connected, like illustrated by lines 108.

In other words, an optical system may be provided in which a first optical arrangement and a second optical arrangement may be moved with respect to each other along at least two axes. According to various embodiments, the first optical arrangement may be moved in the two axes independent from the second optical arrangement. According to various embodiments, the second optical arrangement may be moved in the two axes independent from the first optical arrangement. A user may move the first optical arrangement using a first movement member (for example a first movement knob), which at the same time may be (or may include) a first locking member for locking (or arresting or clamping) the first optical arrangement in a position fixed with respect to a housing of the optical system. A user may move the second optical arrangement using a second movement member (for example a second movement knob), which at the same time may be (or may include) a second locking member for locking (or arresting or clamping) the second optical arrangement in a position fixed with respect to a housing of the optical system. It will be understood that by such an arrangement, the first optical system and the second optical system may be moved and locked independently from each other. Furthermore, by such an arrangement, adjusting and locking of each of the first optical system and the second optical system may be performed by handling only one member (the respective movement member, for example movement knob, which at the same time serves as a locking member).

According to various embodiments, the second direction may be a direction at least substantially parallel to a distance between the first optical arrangement 102 and the second optical arrangement 104.

Figure 1C:
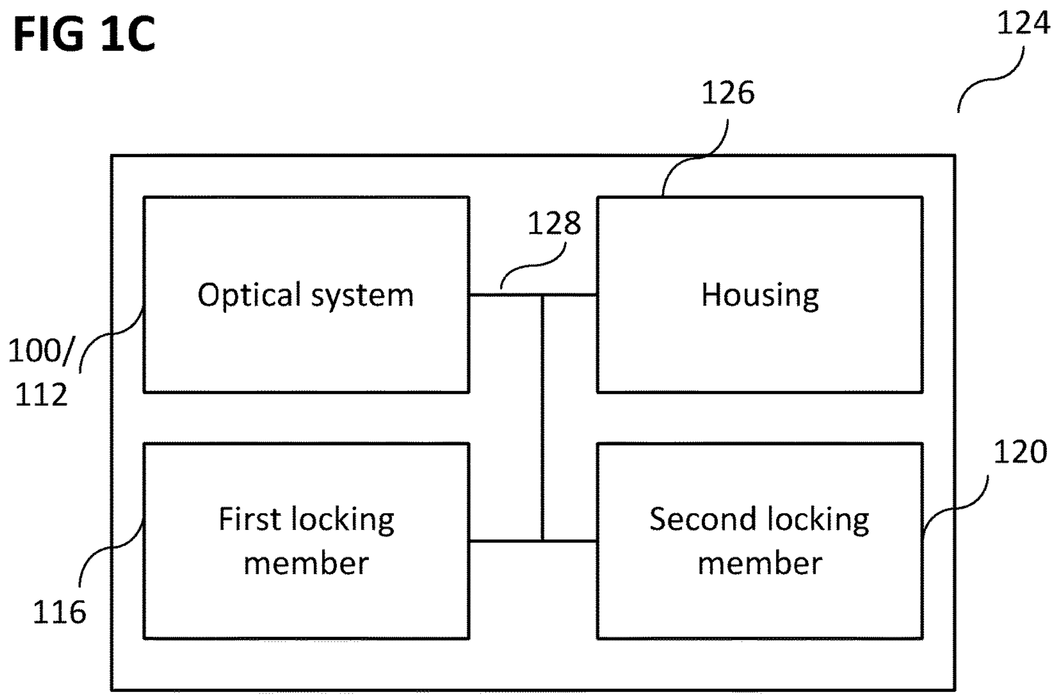
FIG. 1C shows a head mounted display according to various embodiments.
Figure 1B:
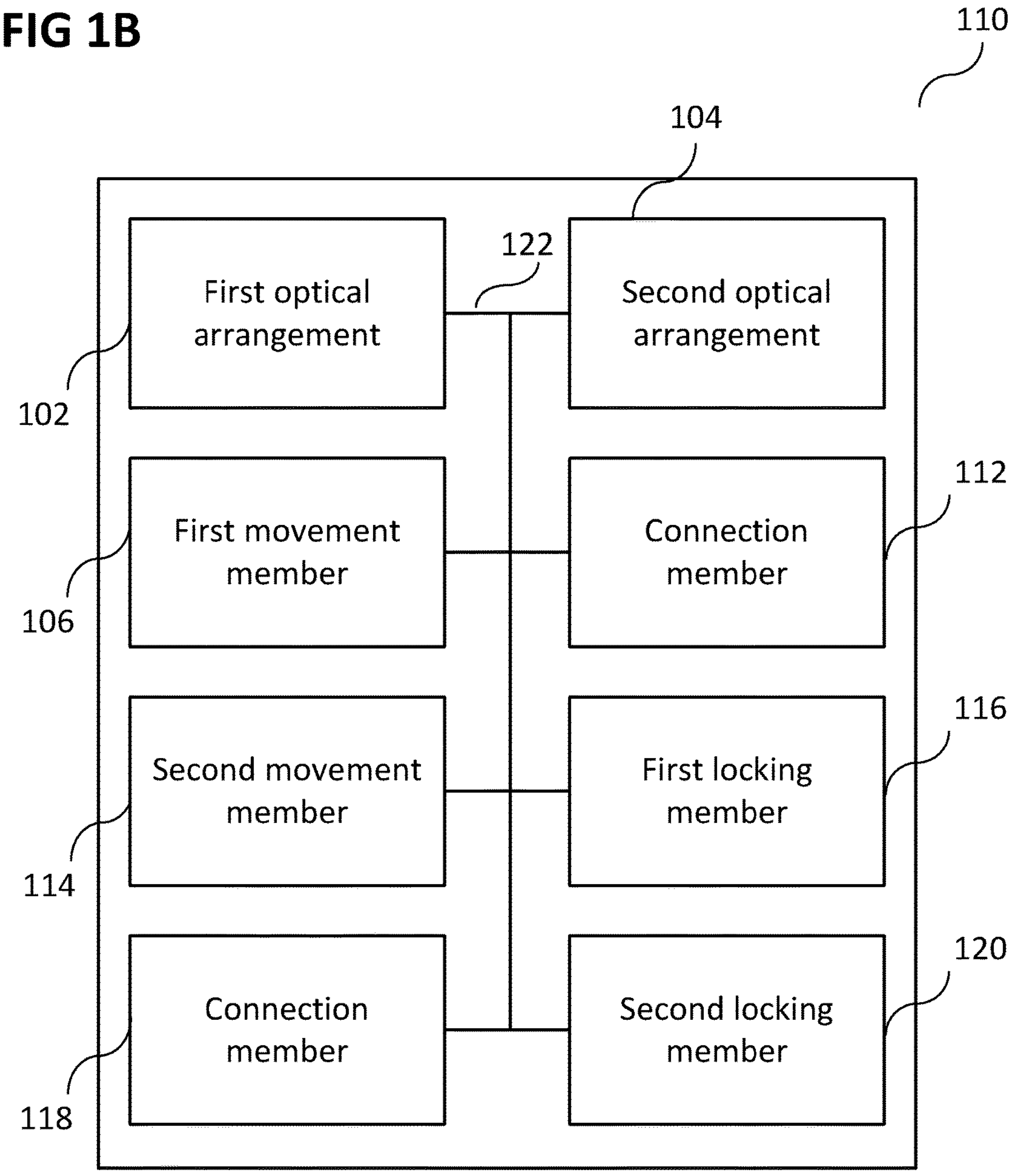

FIG. 1B shows an optical system 110 according to various embodiments. The optical system 110 may, similar to the optical system 100 shown in FIG. 1A, include a first optical arrangement 102 having a first optical axis (for example an axis along which a user looks through the first optical arrangement with one of his eyes). The optical system 110 may, similar to the optical system 100 shown in FIG. 1A, further include a second optical arrangement 104 having a second optical axis (for example an axis along which a user looks through the first optical arrangement with another one of his eyes) at least substantially parallel to the first optical axis. The optical system 110 may, similar to the optical system 100 shown in FIG. 1A, further include a first movement member 106. The first movement member 106 may be configured to move (for example when moved by a user of the optical system 100) the first optical arrangement with respect to the second optical arrangement in a first direction and a second direction. The first direction may be a direction at least substantially parallel to the first optical axis. The second direction may be a direction at least substantially perpendicular to the first optical axis. The optical system 110 may further include a connection member 112, like will be described in more detail below. The optical system 110 may further include a second movement member 114, like will be described in more detail below. The optical system 110 may further include a first locking member 116, like will be described in more detail below. The optical system 110 may further include a connection member 118, like will be described in more detail below. The optical system 110 may further include a second locking member 120, like will be described in more detail below. The first optical arrangement 102, the second optical arrangement 104, the first movement member 106, the connection member 112, the second movement member 114, the first locking member 116, the connection member 118, and the second locking member 120 may be connected, for example mechanically connected, like illustrated by lines 122.

According to various embodiments, the connection member 112 may be configured to connect with the first optical arrangement 102 and with the second optical arrangement 104.

According to various embodiments, the first movement member 106 may be configured to move the first optical arrangement 102 with respect to the connection member 104.

According to various embodiments, the second movement member 114 may be configured to move the second optical arrangement 104 with respect to the first optical arrangement 102 in the first direction and the second direction.

According to various embodiments, the second movement member 114 may be configured to move the second optical arrangement 104 with respect to the connection member 112.

According to various embodiments, the first movement member 106 may include or may be or may be included in a first movement knob.

According to various embodiments, the first locking member 116 may be configured to lock a position of the first optical arrangement 102 with respect to the second optical arrangement 104. According to various embodiments, the first locking member 116 may include or may be or may be included in the first movement member 106. Like will be described in more details below, the first locking member 116 may be connected to the first optical arrangement 102 via a screw, and the screw may be screwed in (for example by a clockwise rotation of the first locking member 116) to lock the first optical arrangement 102, and may be screwed out (for example by a counter-clockwise rotation of the first locking member 116) to unlock the first optical arrangement 102.

According to various embodiments, the first locking member 116 may be configured to lock an orientation of the first optical arrangement 102 with respect to the second optical arrangement 104.

According to various embodiments, the first locking member 116 may be configured to lock a position of the first optical arrangement 102 with respect to the connection member 112.

According to various embodiments, the first locking member 116 may be configured to lock an orientation of the first optical arrangement 102 with respect to the connection member 112.

According to various embodiments, the second movement member 114 may be configured to move the second optical arrangement 102 with respect to the first optical arrangement 104 in the first direction and the second direction.

According to various embodiments, the second movement member 114 may include or may be or may be included in a second movement knob.

According to various embodiments, the second locking member 120 may be configured to lock a position of the second optical arrangement 104 with respect to the first optical arrangement 102. According to various embodiments, the second locking member 120 may include or may be or may be included in the second movement member 114. Like will be described in more details below, the second locking member 120 may be connected to the second optical arrangement 104 via a screw, and the screw may be screwed in (for example by a clockwise rotation of the second locking member 120) to lock the second optical arrangement 104, and may be screwed out (for example by a counter-clockwise rotation of the second locking member 120) to unlock the second optical arrangement 104.

According to various embodiments, the second locking member 120 may be configured to lock an orientation of the second optical arrangement 104 with respect to the first optical arrangement 102.

According to various embodiments, the second locking member 120 may be configured to lock a position of the second optical arrangement 104 with respect to the connection member 112.

According to various embodiments, the second locking member 120 may be configured to lock an orientation of the second optical arrangement 104 with respect to the connection member 112.

According to various embodiments, the first optical arrangement 102 may include or may be or may be included in a first lens arrangement.

According to various embodiments, the second optical arrangement 104 may include or may be or may be included in a second lens arrangement.

According to various embodiments, the first optical arrangement 102 may include or may be or may be included in a first display.

According to various embodiments, the second optical arrangement 104 may include or may be or may be included in a second display.

FIG. 1C shows a head mounted display 124 according to various embodiments. The head mounted display 124 may include an optical system (for example the optical system 100 described above with reference to FIG. 1A or the optical system 110 described above with reference to FIG. 1B). The head mounted display 124 may further include a housing 126, like will be described in more detail below. The head mounted display 124 may further include a first locking member (for example the first locking member 116 described above with reference to FIG. 1B). The head mounted display 124 may further include a second locking member (for example the second locking member 120 described above with reference to FIG. 1B). The optical system 100 (or 110), the housing 126, the first locking member 116, and the second locking member 120 may be connected, for example mechanically connected, like illustrated by lines 128.

According to various embodiments, the housing 126 may include or may be or may be included in a connection member configured to connect with the first optical arrangement and with the second optical arrangement (for example the connection member 112 like described above with reference to FIG. 1B).

According to various embodiments, the first locking member 116 may be configured to lock at least one of a position of the first optical arrangement 102 with respect to the housing 126 or an orientation of the first optical arrangement 102 with respect to the housing 126.

According to various embodiments, the first locking member 116 may be configured to engage with the housing 126 via a hole in the housing 126.

According to various embodiments, the first locking member 116 may include an upper portion and a lower portion. The upper portion of the first locking member 116 may have a diameter larger than a diameter of the hole. The lower portion of the first locking member 116 may have a diameter larger than a diameter of the hole. The upper portion of the first locking member 116 and the lower portion of the first locking member 116 may be connected via a screw.

According to various embodiments, the second locking member 120 may be configured to lock at least one of a position of the second optical arrangement 104 with respect to the housing 126 or an orientation of the second optical arrangement 104 with respect to the housing 126.

According to various embodiments, the second locking member 120 may be configured to engage with the housing 126 via a hole in the housing 126.

According to various embodiments, the second locking member 120 may include an upper portion and a lower portion. The upper portion of the second locking member 120 may have a diameter larger than a diameter of the hole. The lower portion of the second locking member 120 may have a diameter larger than a diameter of the hole. The upper portion of the second locking member 120 and the lower portion of the second locking member 120 may be connected via a screw.

Figure 2:
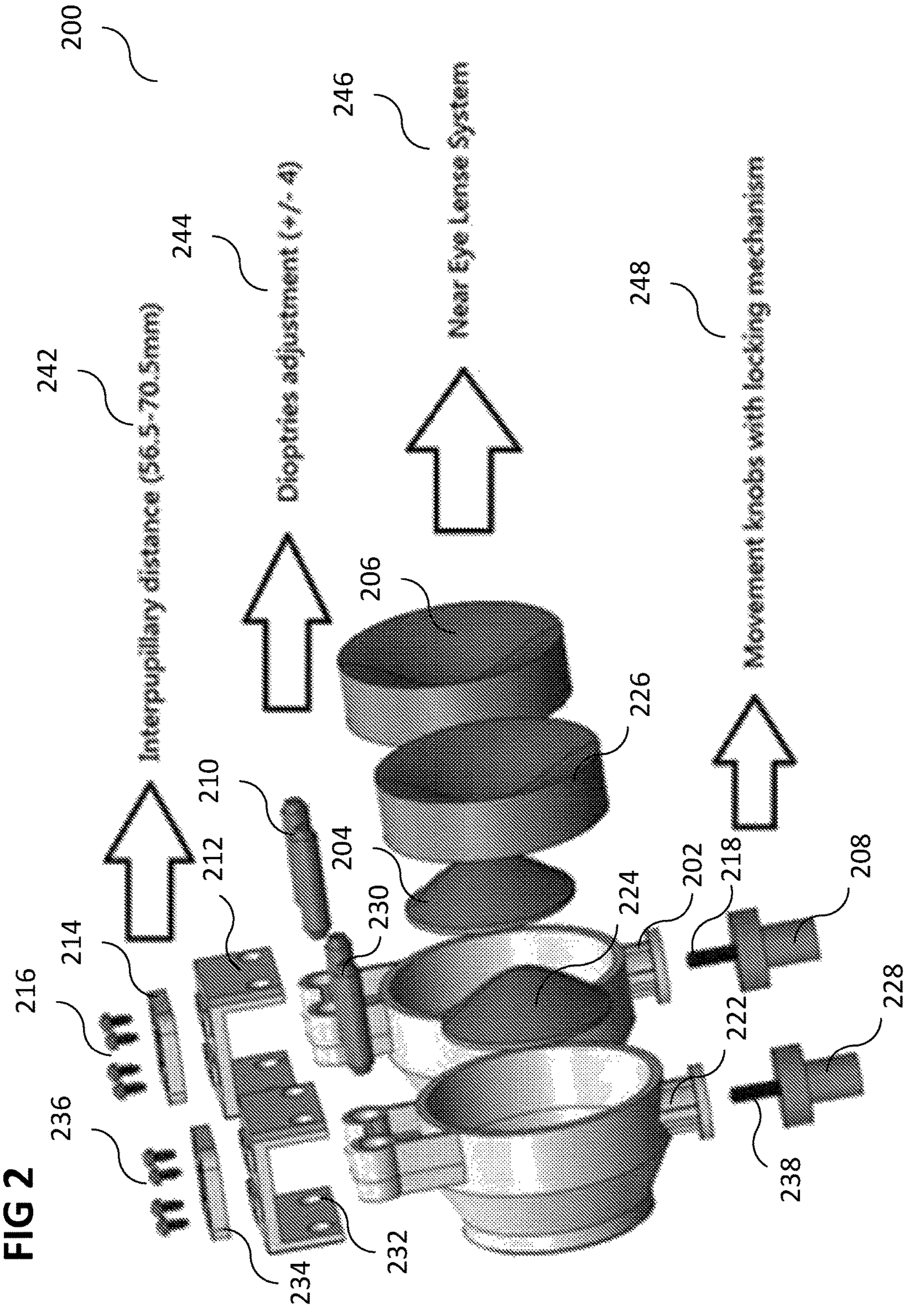
FIG. 2 to FIG. 11 show various views of optical arrangements according to various embodiments.

FIG. 2 shows an exploded view 200 of an optical system (for example including an adjustment assembly) according to various embodiments. The optical system 200 may include a near eye lens system 246 (for example including lenses 204, 206, 224, and 226). First screws 216 may be provided to attach a first flat plate 214 to a first angle plate 212. First pins 210 may provide for the first angle plate 212 connecting to a first lens holder 202. A first movement knob 208 may be connected to the first lens holder 202. The components 202 to 216 may provide a portion of the angular system for the right eye of a user. Second screws 236 may be provided to attach a second flat plate 234 to a second angle plate 232. Second pins 230 may provide for the second angle plate 232 connecting to a second lens holder 222. A second movement knob 228 may be connected to the second lens holder 222. The components 222 to 236 may provide a portion of the angular system for the left eye of a user. Like indicated in 242, the interpupillary distance may be changed (for example from 56.5 mm to 70.5 mm). Like indicated in 244, a diopters adjustment may be provided (for example in a range of +/−4). Like indicated in 248, the movement knobs 208 and 228 may be provided with a locking member (in other words: a locking mechanism).

By the arrangement like shown in FIG. 2, the first optical arrangement (for example including the first lens holder 202) may be moved and locked independent from the second optical arrangement (for example including the second lens holder 222), and vice versa. According to various embodiments, a rail bar (not shown in FIG. 2) may be provided connecting the first flat plate 214 and the second flat plate 234, which may allow a relative lateral movement between the first optical arrangement and the second optical arrangement, and may thus provide for an adjustment of the interpupillary distance, like indicated by 242. It will be understood that the lateral direction is a direction which is at least substantially perpendicular to the optical axes of the first optical arrangement and the second optical arrangement.

The first pins 210 may allow the first optical arrangement to move in a direction at least substantially parallel to the optical axis of the first optical arrangement, and may thus provide for an adjustment of the first optical arrangement to the diopters (for example of the right eye) of the user, like indicated by 244. The second pins 230 may allow the second optical arrangement to move in a direction at least substantially parallel to the optical axis of the second optical arrangement, and may thus provide for an adjustment of the second optical arrangement to the diopters (for example of the left eye) of the user, like indicated by 244. The optical axis of the first optical arrangement may be at least substantially parallel to the optical axis of the second optical arrangement.

The first movement knob 208 and the second movement knob 228 may be operated independent from each other, and thus the first optical arrangement and the second optical arrangement may be moved (and thus adjusted) in the two axes independent from each other. The respective movement knobs provide for a movement and adjustment in both axes. It will be understand that the first movement knob 208 shown in FIG. 2 may correspond to both the first movement member 106 and the first locking member 116 of FIG. 1B. It will be understand that the second movement knob 228 shown in FIG. 2 may correspond to both the second movement member 114 and the second locking member 120 of FIG. 1B. As such, movement (and thus adjustment) and locking may be provided by the same member of the system (i.e. by the respective movement knob).

The first movement knob 208 may include a first locking screw 218, which may be screwed into a corresponding first receiving portion (for example a first thread) in the first optical system, for example in the first lens holder 202. The optical system shown in FIG. 2 may include a housing (not shown in FIG. 2), so that when the first movement knob 208 is screwed in, for example by a clockwise rotation of the first movement knob 208 and the first locking screw 218, the first movement knob 208 and the first lens holder 202 clamp a portion of the housing in-between the first movement knob 208 and the first lens holder 202, and thus the first lens holder 202 (and thus the first optical arrangement) is locked with respect to the housing.

The second movement knob 228 may include a second locking screw 238, which may be screwed into a corresponding second receiving portion (for example a second thread) in the second optical system, for example in the second lens holder 222. When the second movement knob 228 is screwed in, for example by a clockwise rotation of the second movement knob 228 and the second locking screw 238, the second movement knob 228 and the second lens holder 222 clamp a portion of the housing in-between the second movement knob 228 and the second lens holder 222, and thus the second lens holder 222 (and thus the second optical arrangement) is locked with respect to the housing.

Figure 3:
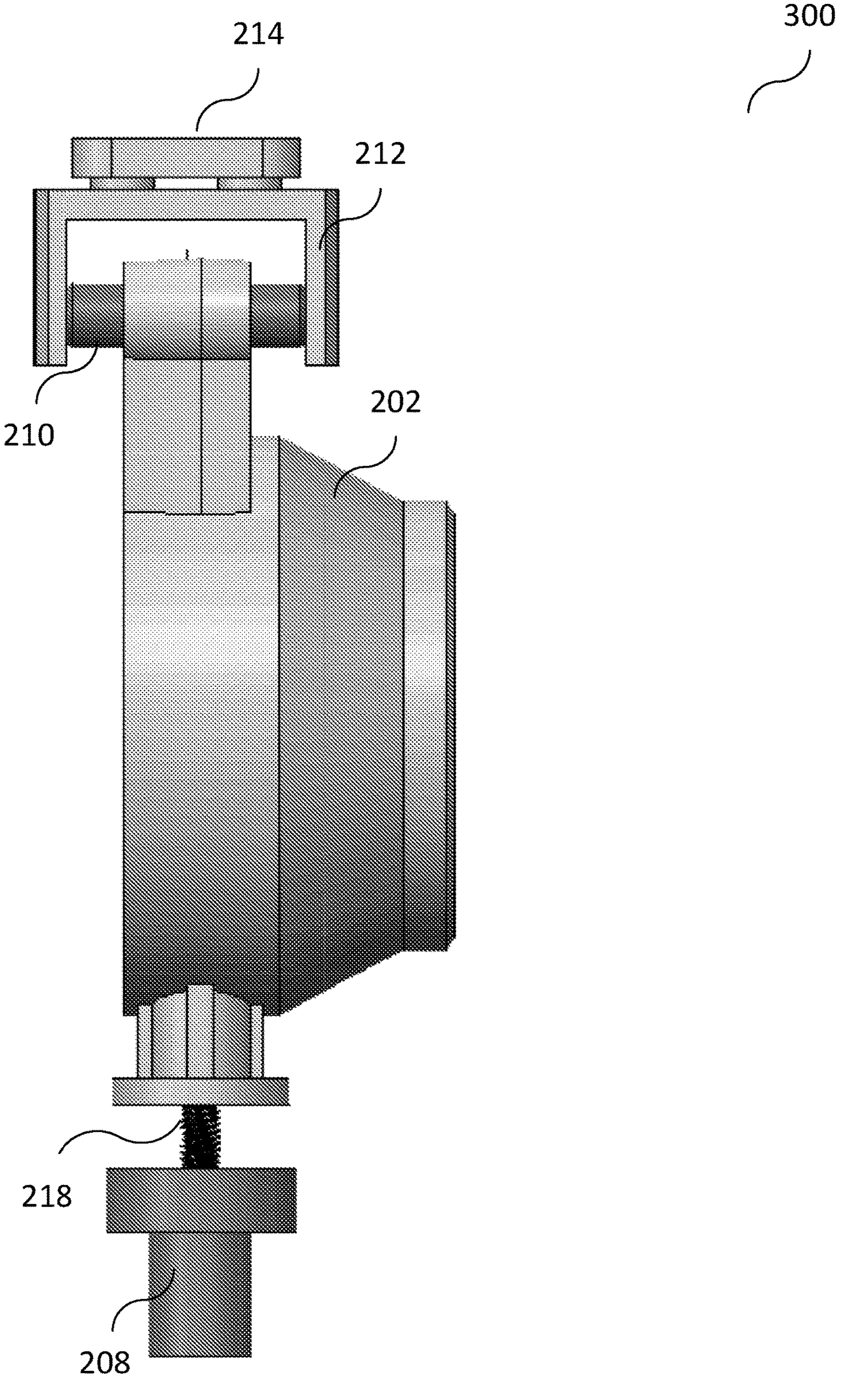

FIG. 3 shows a side view 300 of the right side of an optical system (for example including an adjustment assembly) according to various embodiments. Various portions of the optical system shown in FIG. 3 may be similar or identical to portions of the optical system shown in FIG. 2, so that the same reference signs may be used and duplicate description may be omitted.

Figure 4:
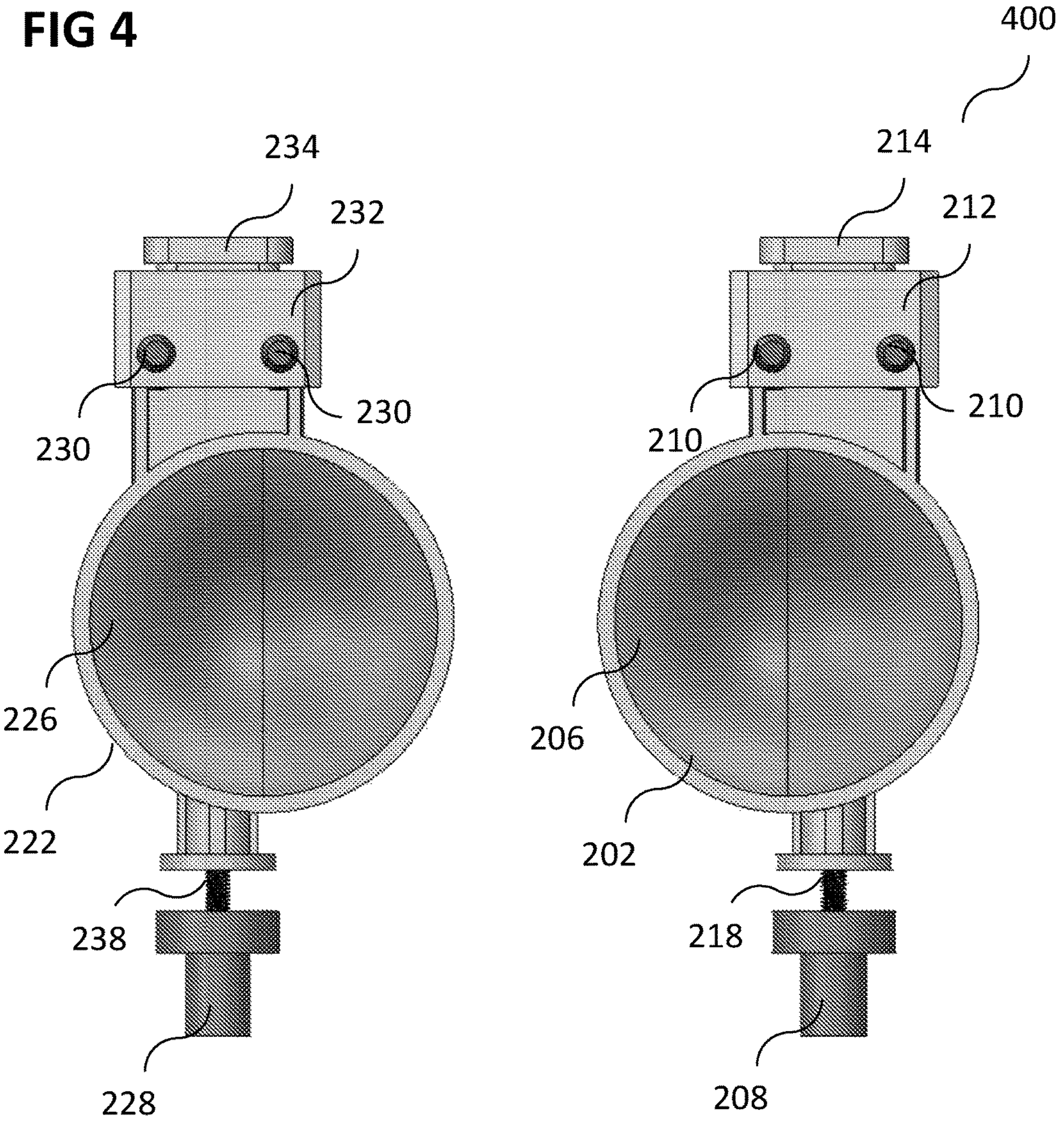

FIG. 4 shows a rear view 400 of an optical system (for example including an adjustment assembly), for example a view that a person who is about to hear a head mounted display including the optical system would see, according to various embodiments. Various portions of the optical system shown in FIG. 4 may be similar or identical to portions of the optical system shown in FIG. 2, so that the same reference signs may be used and duplicate description may be omitted.

Figure 5:
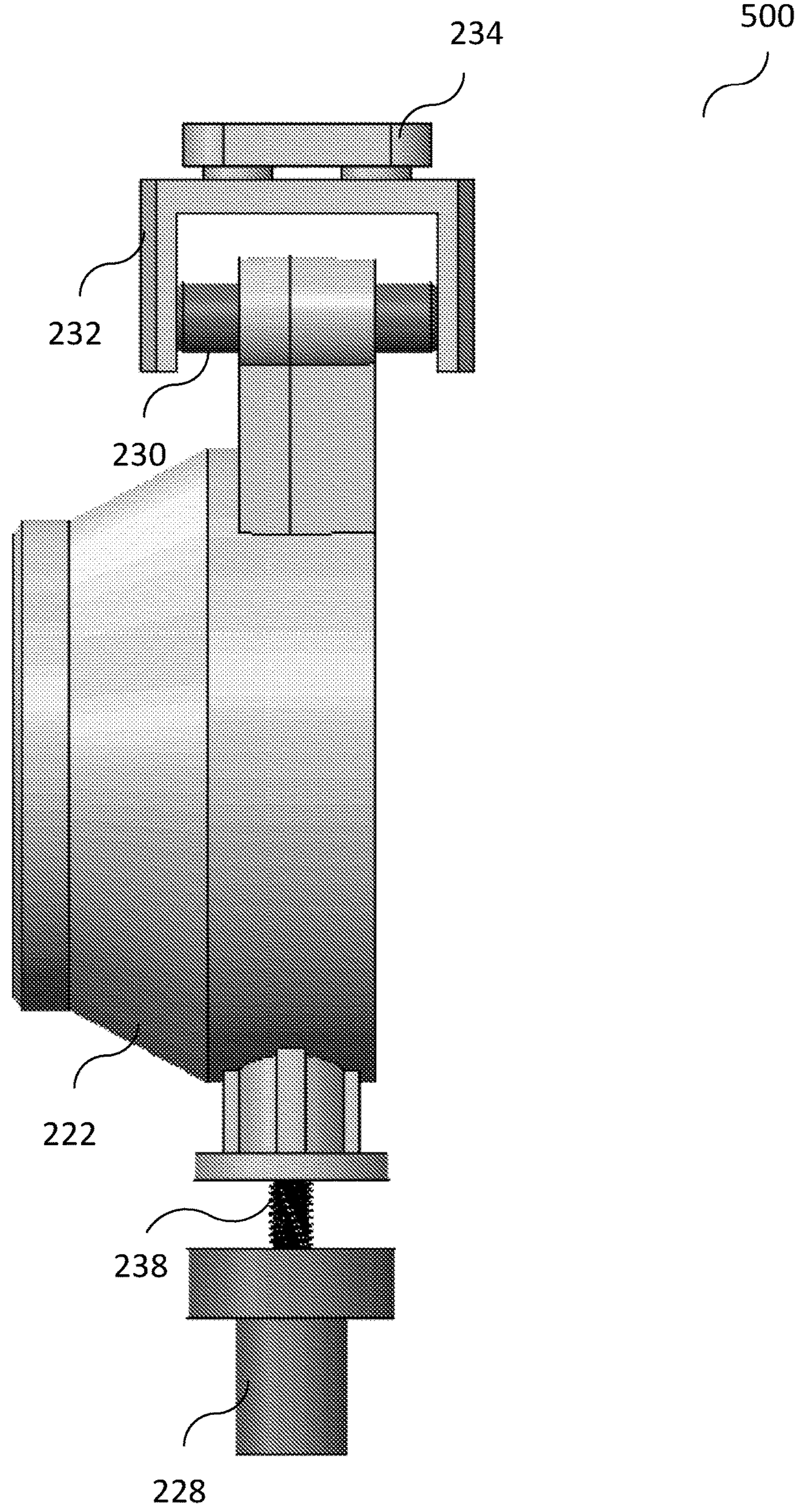

FIG. 5 shows a side view 500 of the left side of an optical system (for example including an adjustment assembly) according to various embodiments. Various portions of the optical system shown in FIG. 5 may be similar or identical to portions of the optical system shown in FIG. 2, so that the same reference signs may be used and duplicate description may be omitted.

Figure 6:
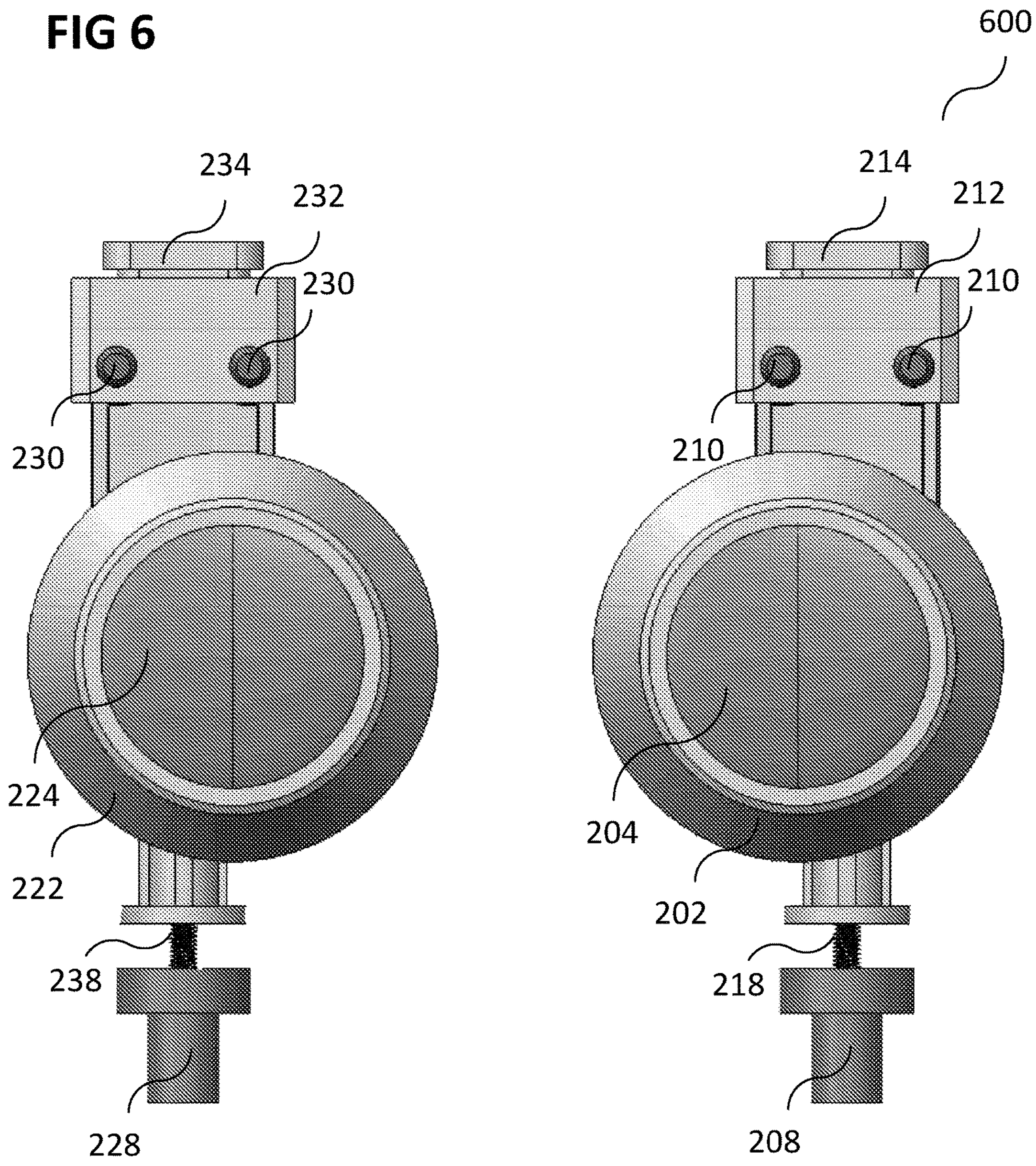

FIG. 6 shows a front view 600 of an optical system (for example including an adjustment assembly) according to various embodiments. Various portions of the optical system shown in FIG. 6 may be similar or identical to portions of the optical system shown in FIG. 2, so that the same reference signs may be used and duplicate description may be omitted.

Figure 7:
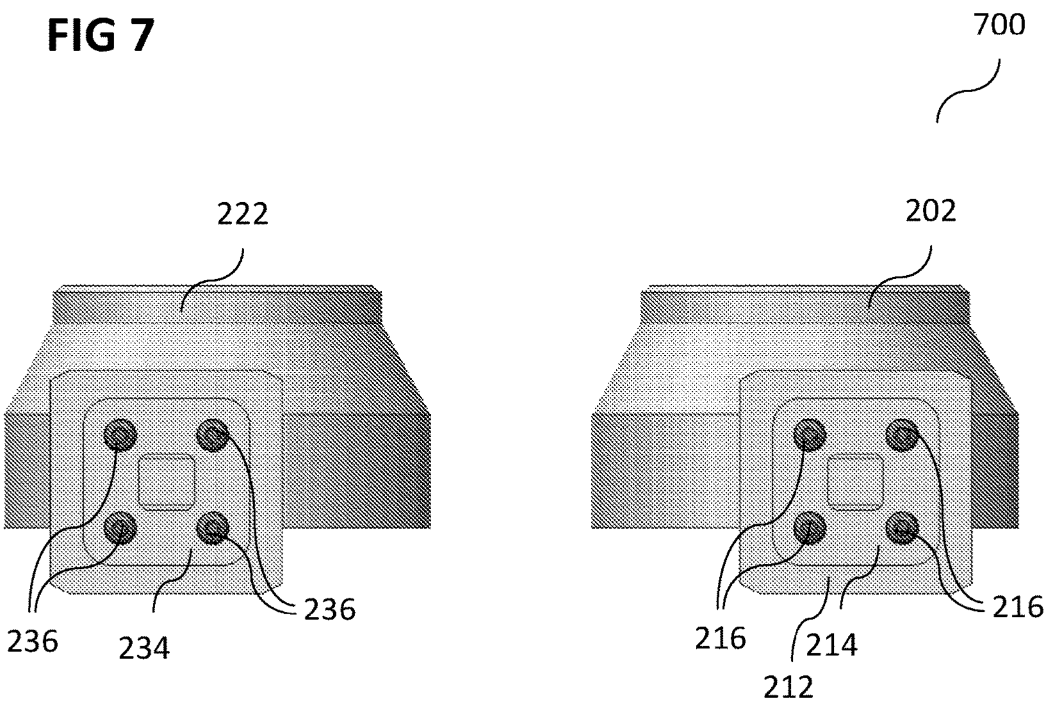

FIG. 7 shows a top view 700 of an optical system (for example including an adjustment assembly) according to various embodiments. Various portions of the optical system shown in FIG. 7 may be similar or identical to portions of the optical system shown in FIG. 2, so that the same reference signs may be used and duplicate description may be omitted.

Figure 8:
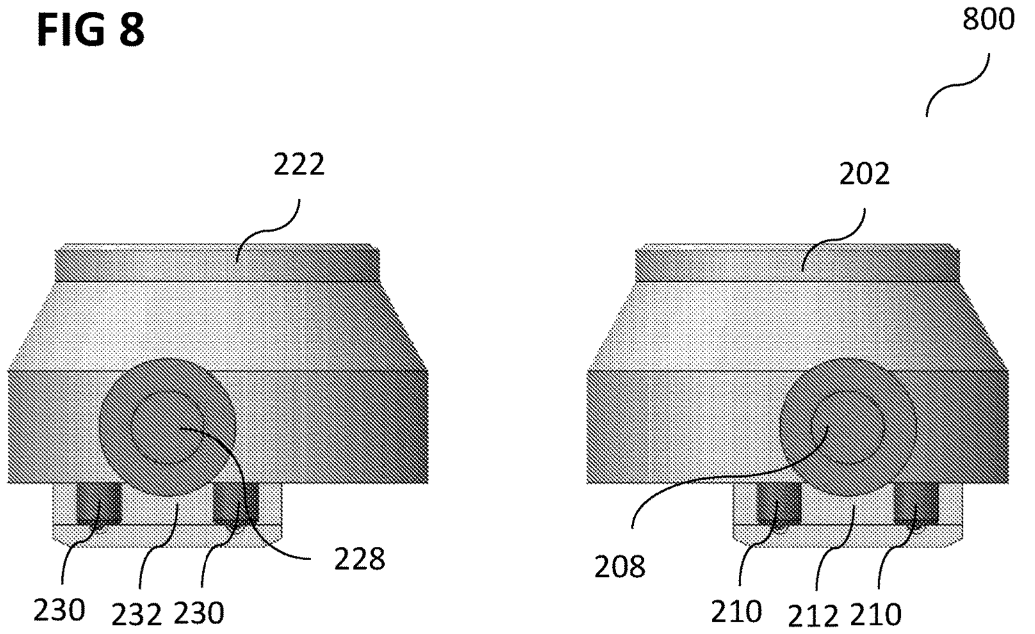

FIG. 8 shows a bottom view 800 of an optical system (for example including an adjustment assembly) according to various embodiments. Various portions of the optical system shown in FIG. 8 may be similar or identical to portions of the optical system shown in FIG. 2, so that the same reference signs may be used and duplicate description may be omitted.

Figure 9:
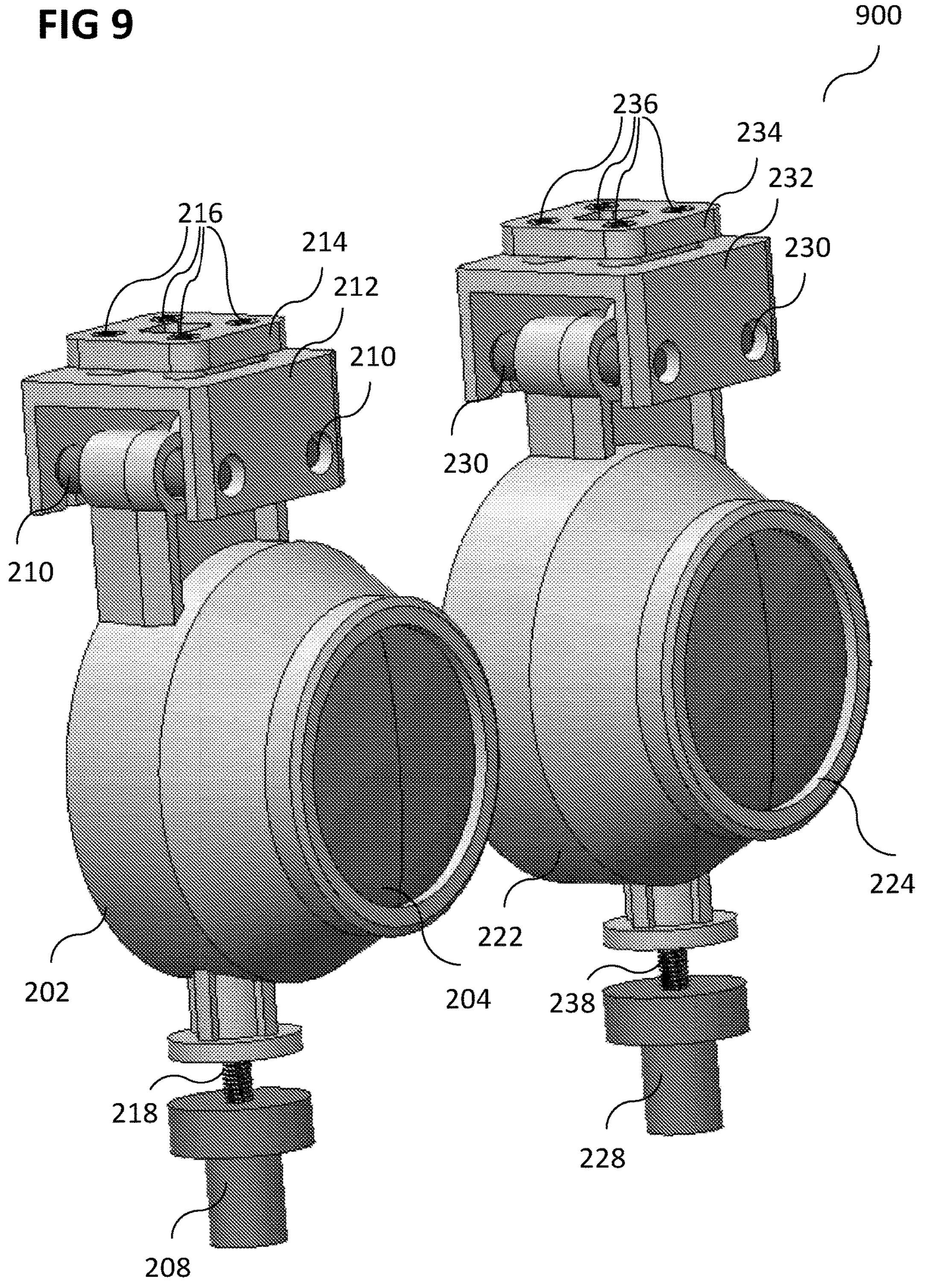

FIG. 9 shows a right front side view 900 of an optical system (for example including an adjustment assembly) according to various embodiments. Various portions of the optical system shown in FIG. 9 may be similar or identical to portions of the optical system shown in FIG. 2, so that the same reference signs may be used and duplicate description may be omitted.

Figure 10:
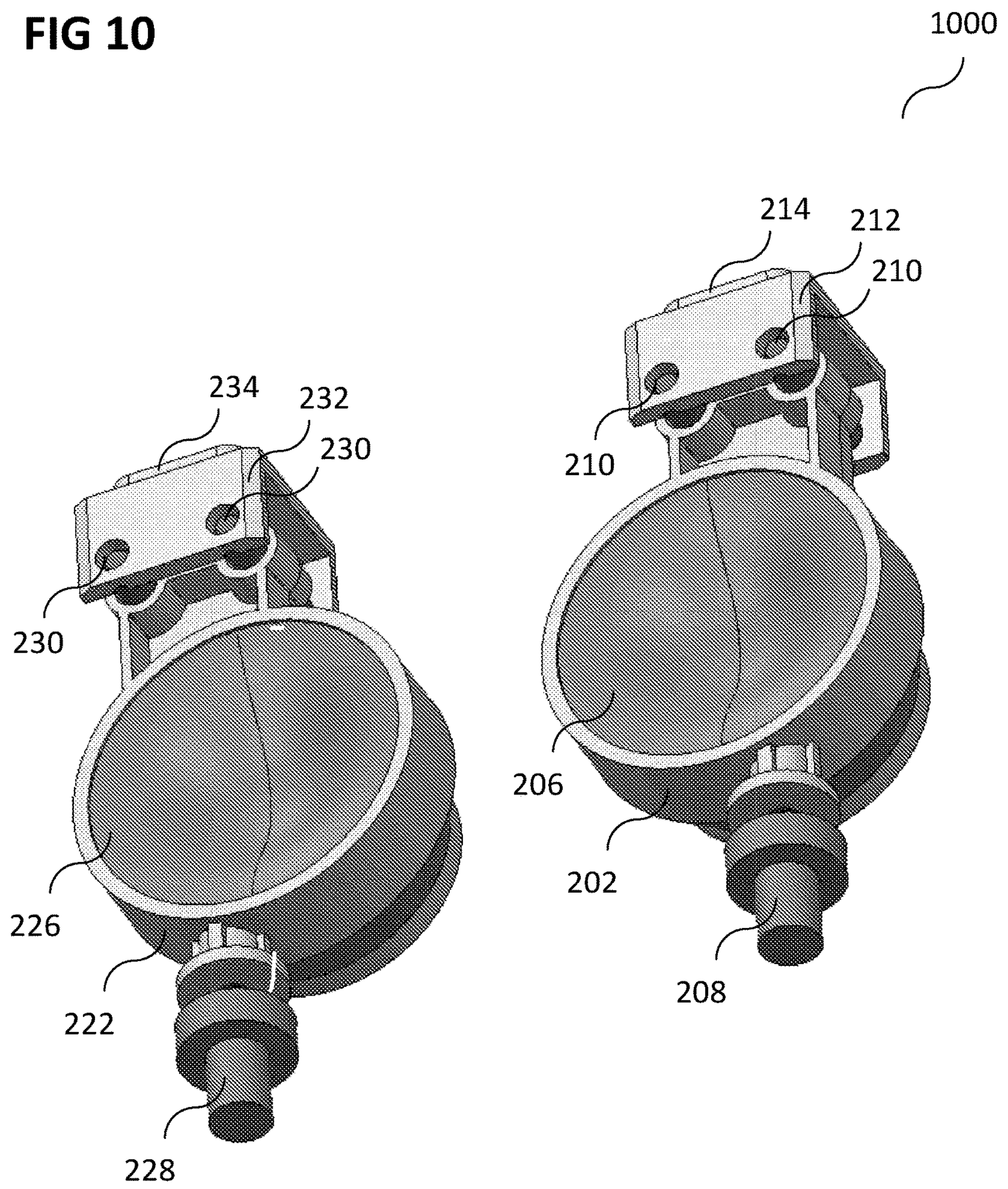

FIG. 10 shows a lower rear view 1000 of an optical system (for example including an adjustment assembly) according to various embodiments. Various portions of the optical system shown in FIG. 10 may be similar or identical to portions of the optical system shown in FIG. 2, so that the same reference signs may be used and duplicate description may be omitted.

Figure 11:
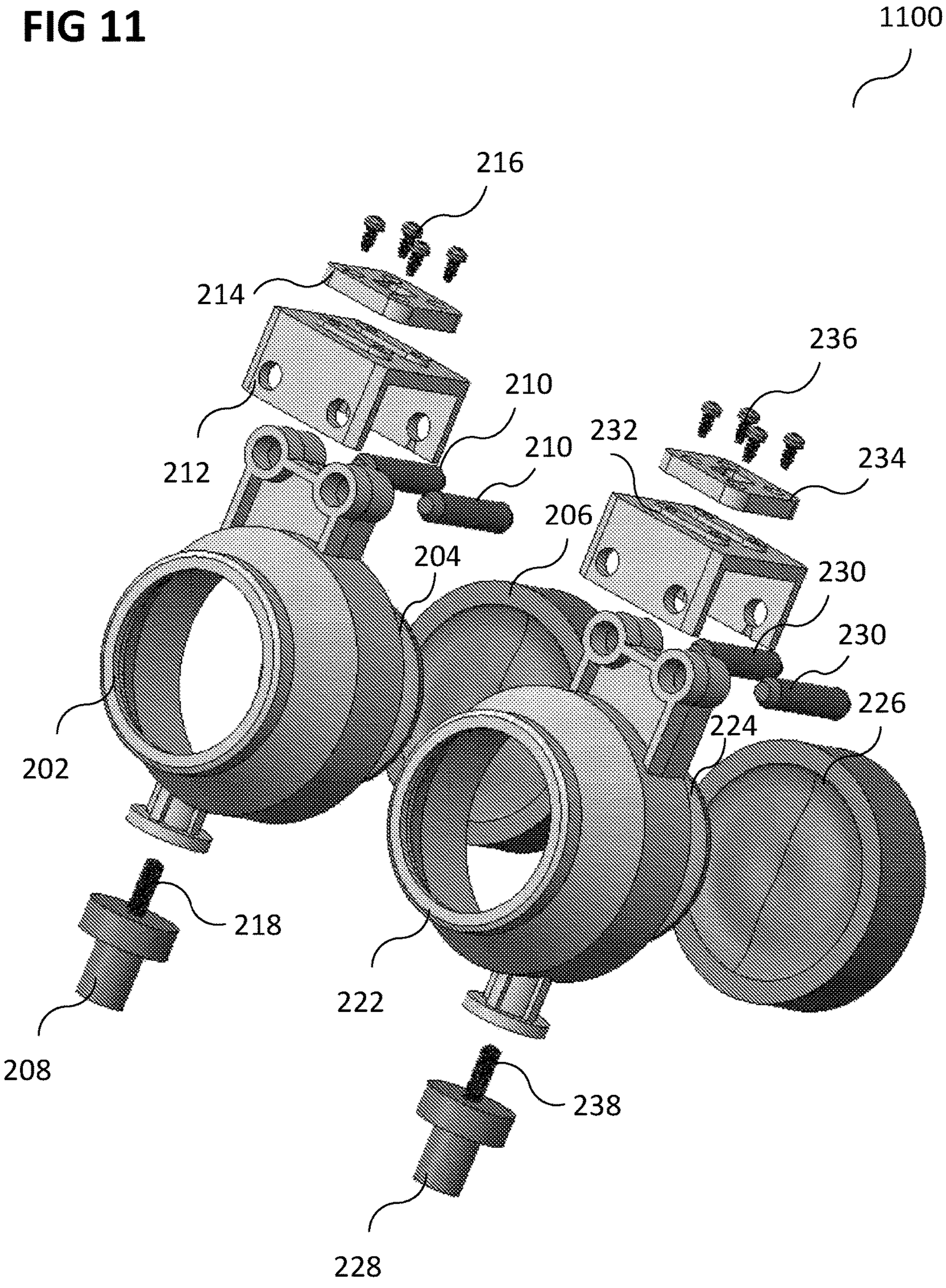

FIG. 11 shows an exploded view 1100 of the right side of an optical system (for example including an adjustment assembly) according to various embodiments. Various portions of the optical system shown in FIG. 11 may be similar or identical to portions of the optical system shown in FIG. 2, so that the same reference signs may be used and duplicate description may be omitted.

Figure 12:
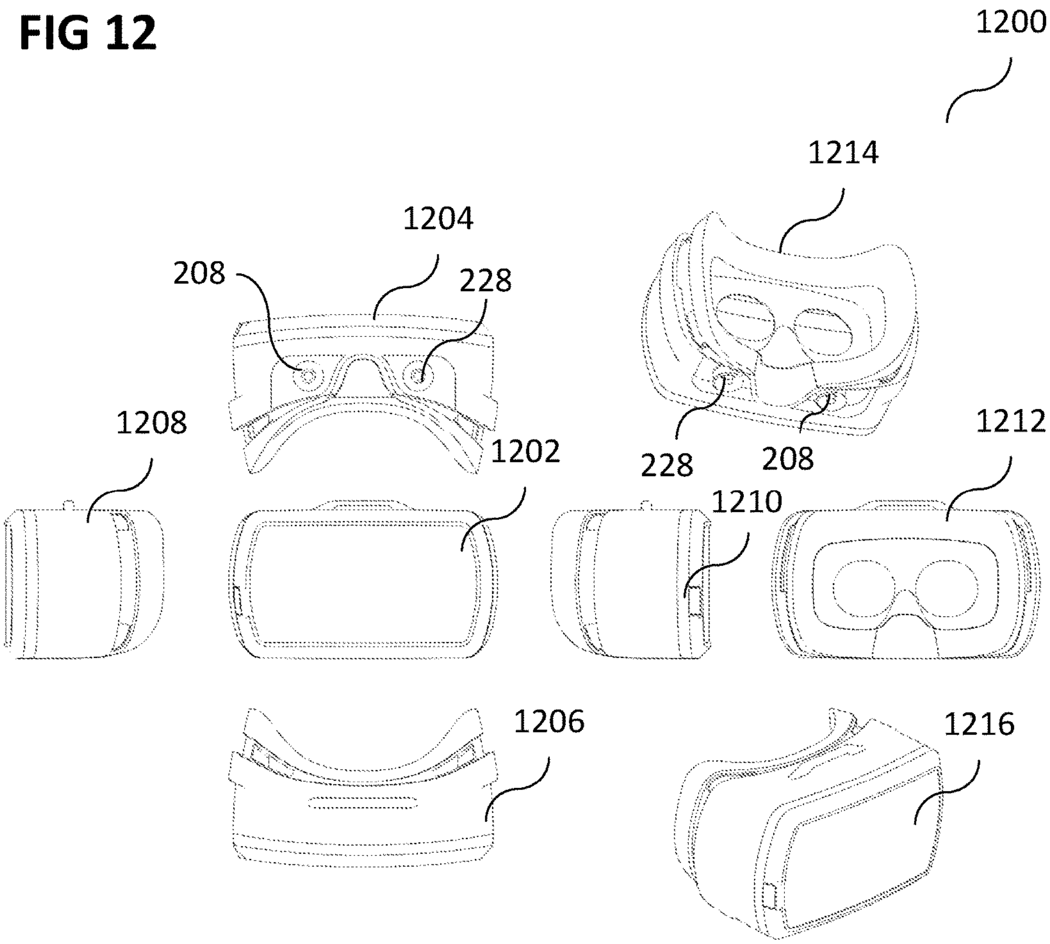
FIG. 12 to FIG. 16 show various views of head mounted displays according to various embodiments.

FIG. 12 shows an illustration 1200 of various views of a head mounted display according to various embodiments. A front view 1202, a bottom view 1204, a top view 1206, a right side view 1208, a left side view 1210, a rear view 1212, a rear perspective view 1214, and a front perspective view 1216 of the head mounted display are shown. Various portions of the optical system shown in FIG. 12 may be similar or identical to portions of the optical system shown in FIG. 2, so that the same reference signs may be used and duplicate description may be omitted.

Figure 13:
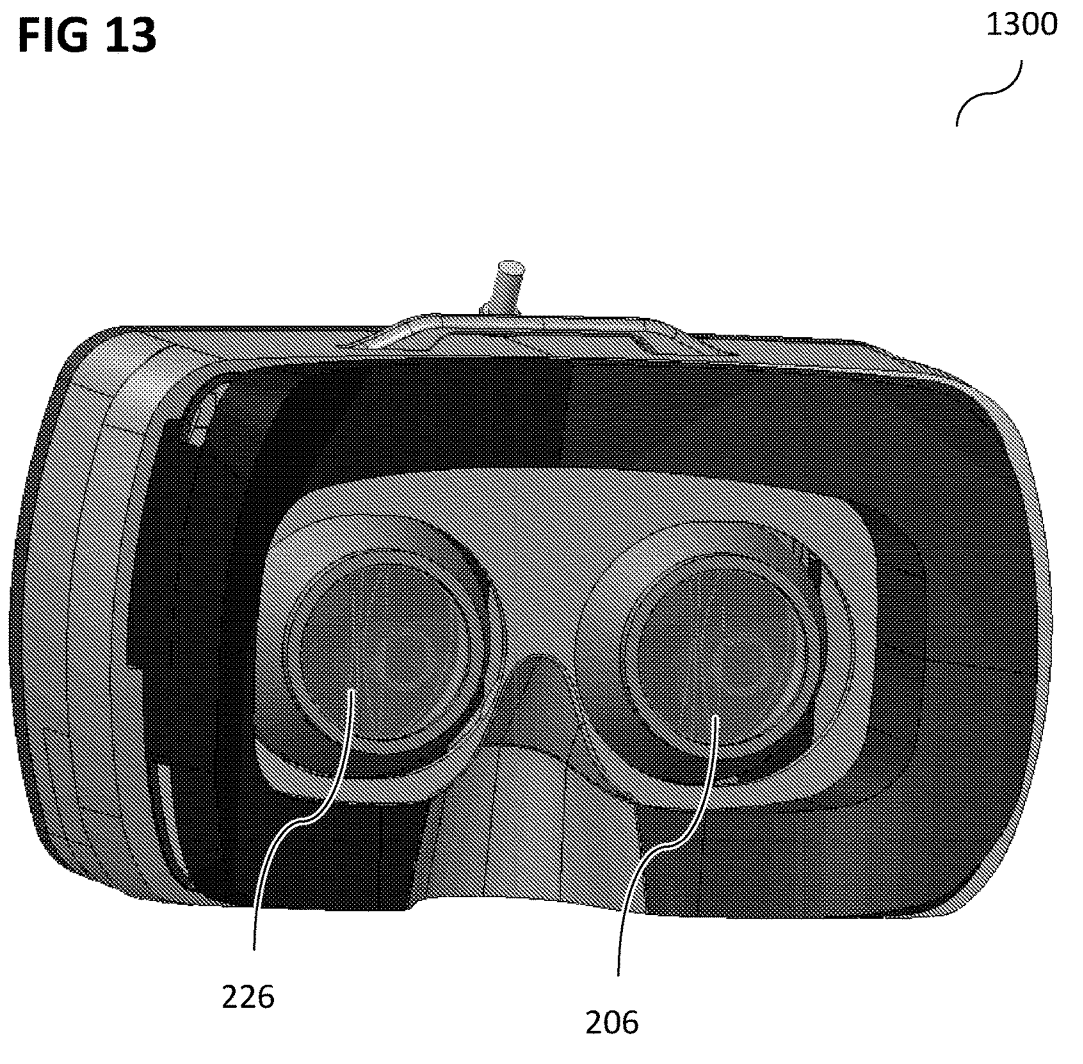

FIG. 13 shows an illustration 1300 of a perspective rear view of a head mounted display including an optical system according to various embodiments. Various portions of the optical system shown in FIG. 13 may be similar or identical to portions of the optical system shown in FIG. 2, so that the same reference signs may be used and duplicate description may be omitted.

Figure 14:
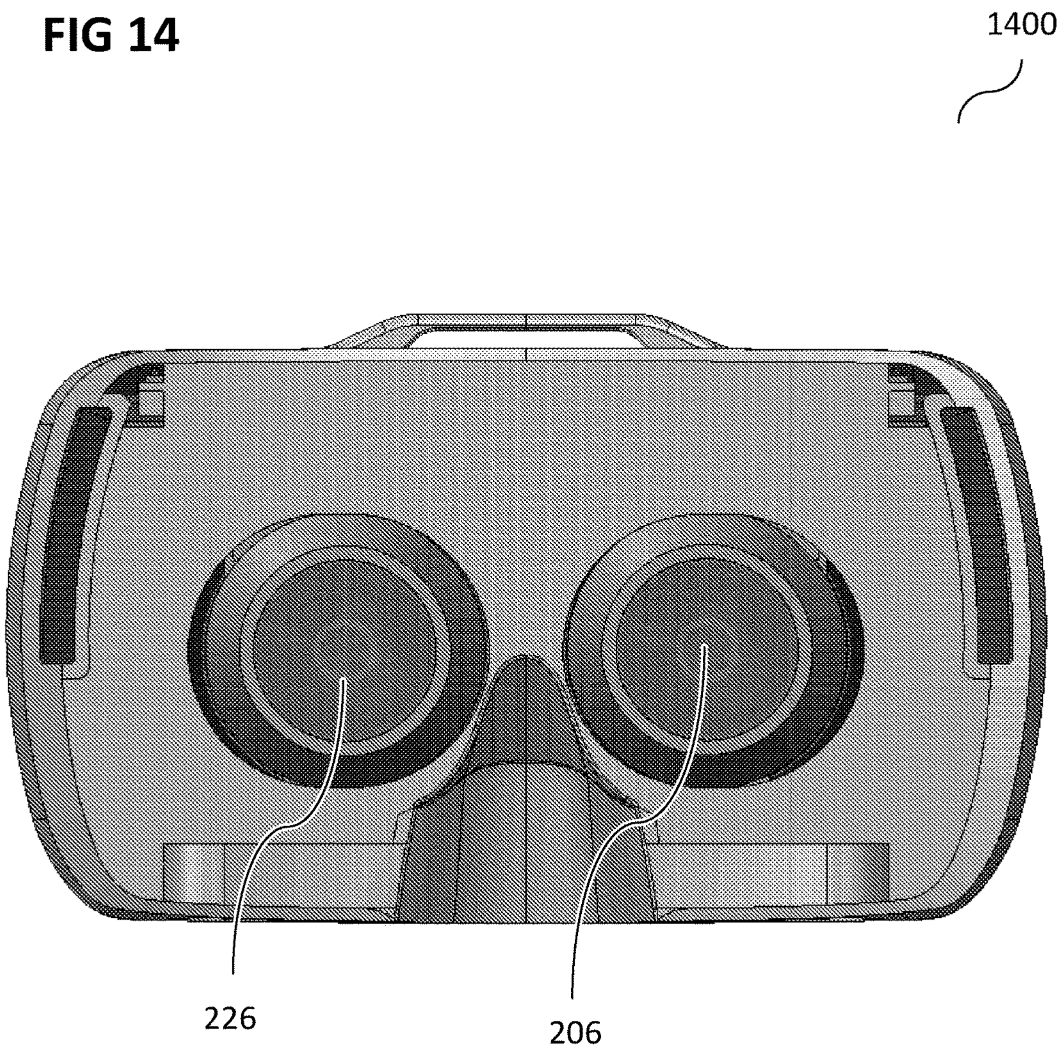

FIG. 14 shows an illustration 1400 of a rear view of a head mounted display including an optical system according to various embodiments. Various portions of the optical system shown in FIG. 14 may be similar or identical to portions of the optical system shown in FIG. 2, so that the same reference signs may be used and duplicate description may be omitted.

Figure 15:
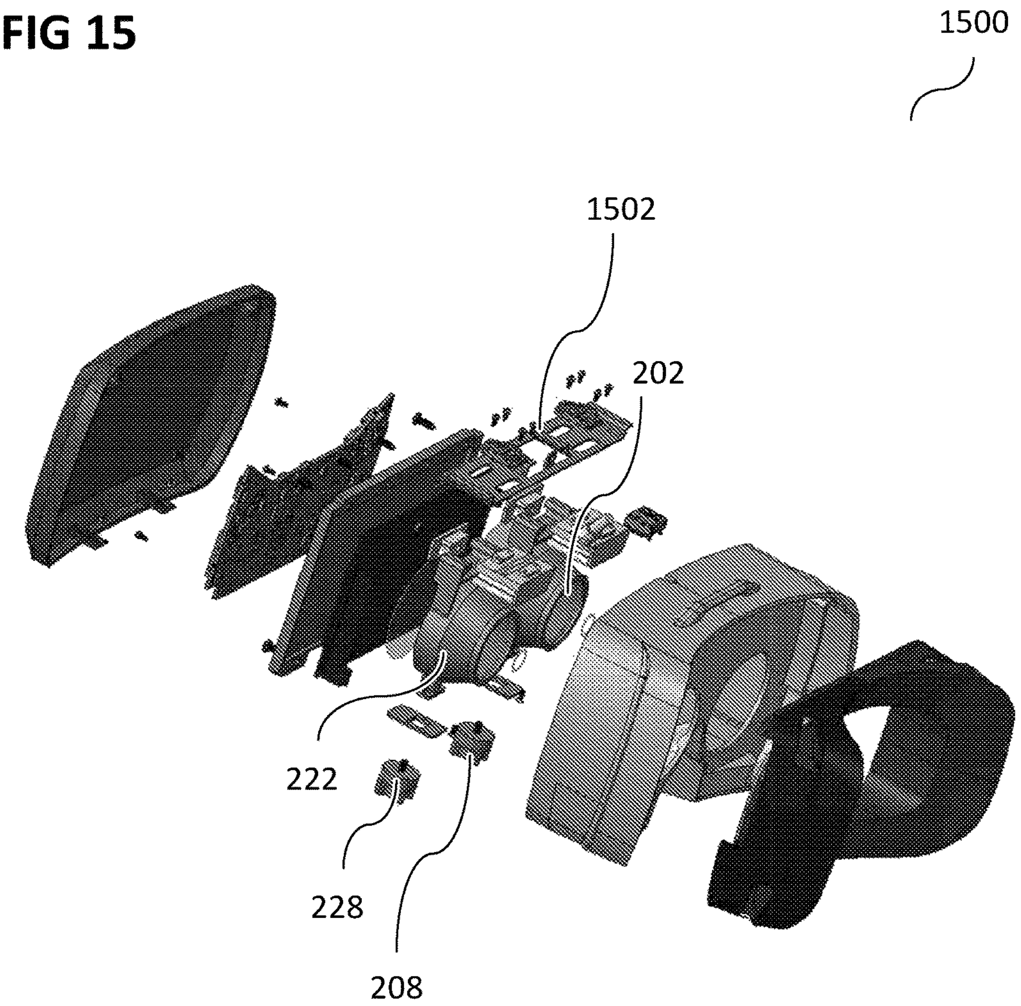

FIG. 15 shows an illustration 1500 of an exploded view of a head mounted display including an optical system according to various embodiments. Various portions of the optical system shown in FIG. 15 may be similar or identical to portions of the optical system shown in FIG. 2, so that the same reference signs may be used and duplicate description may be omitted. Furthermore, the rail bar 1502 is shown in FIG. 15.

Figure 16:
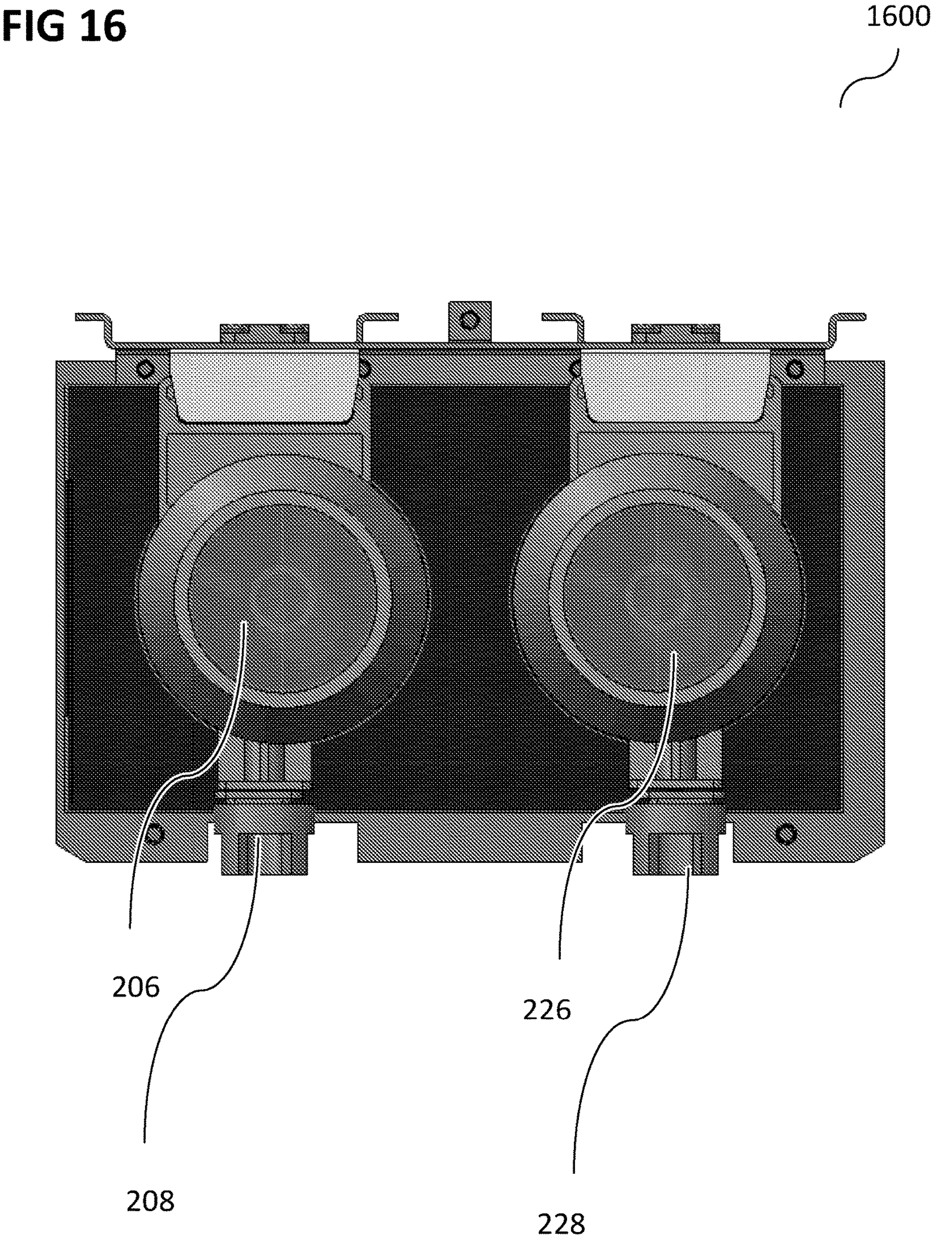

FIG. 16 shows an illustration 1600 of a front view of a head mounted display including an optical system according to various embodiments. Various portions of the optical system shown in FIG. 16 may be similar or identical to portions of the optical system shown in FIG. 2, so that the same reference signs may be used and duplicate description may be omitted.

Figure 17:
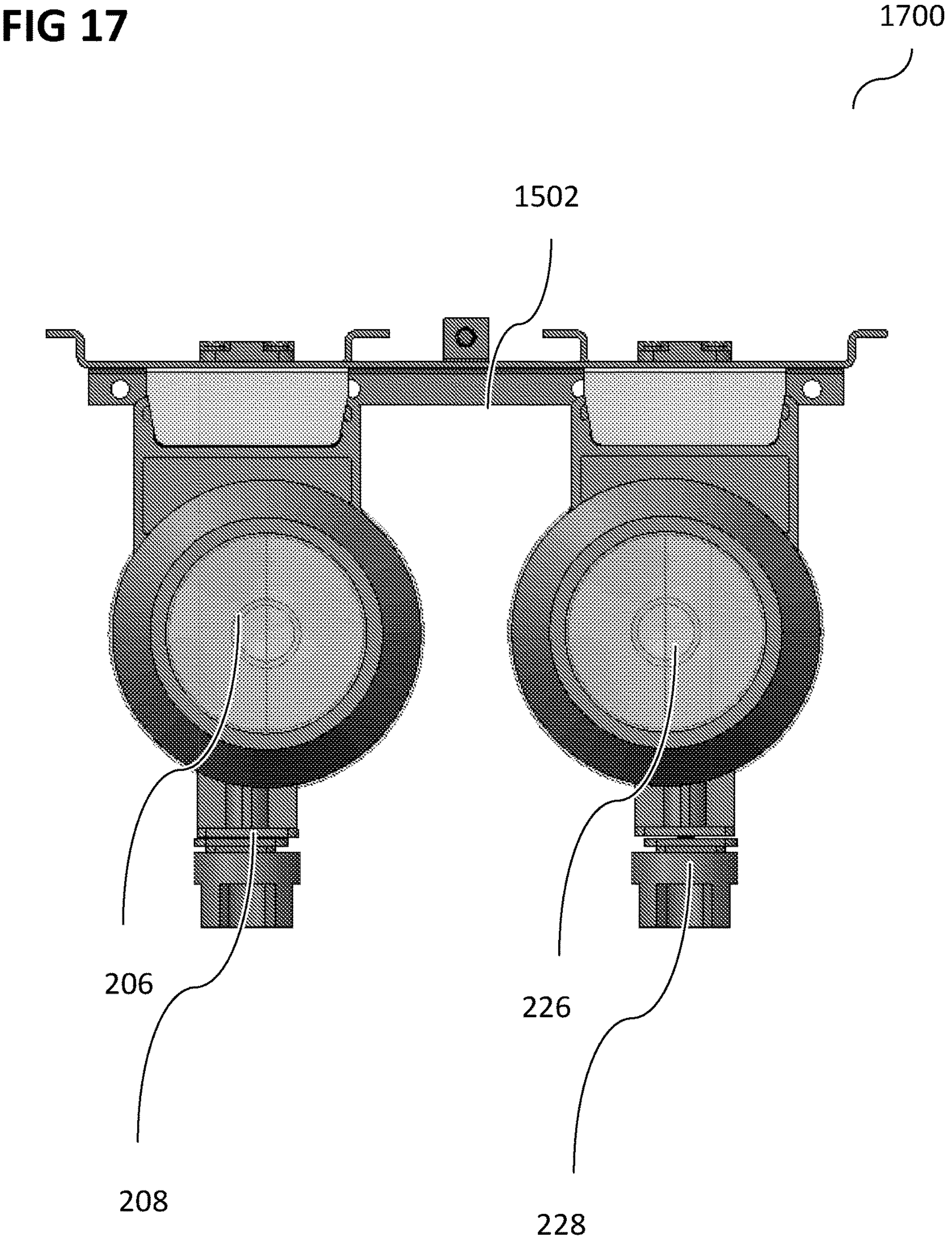
FIG. 17 to FIG. 23 show various views of optical arrangements according to various embodiments.

FIG. 17 shows an illustration 1700 of a front view of an optical system according to various embodiments. Various portions of the optical system shown in FIG. 17 may be similar or identical to portions of the optical system shown in FIG. 2 or FIG. 15, so that the same reference signs may be used and duplicate description may be omitted.

Figure 18:
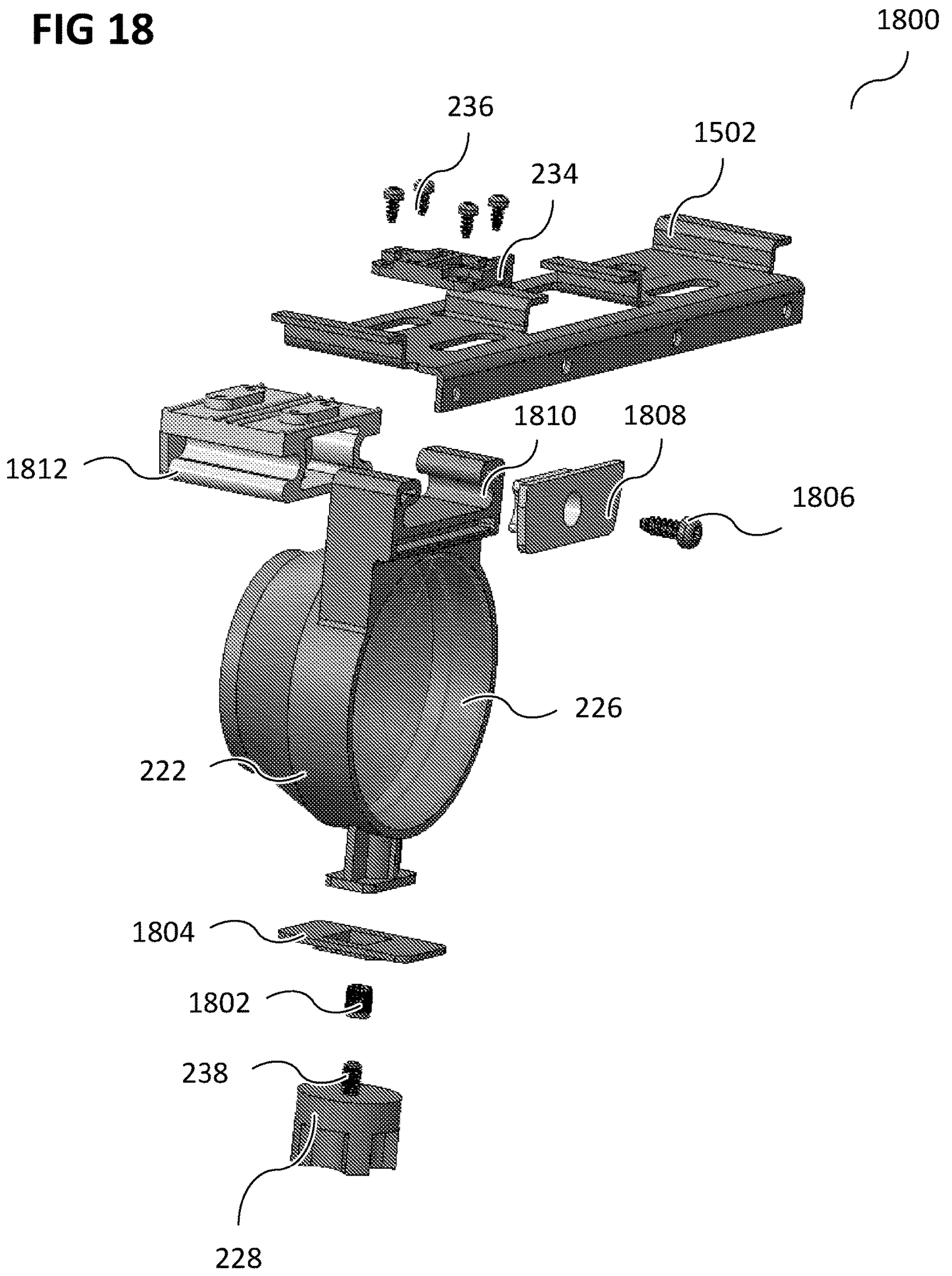

FIG. 18 shows an illustration 1800 of an exploded view of a portion of an optical system according to various embodiments. Various portions of the optical system shown in FIG. 18 may be similar or identical to portions of the optical system shown in FIG. 2 or FIG. 15, so that the same reference signs may be used and duplicate description may be omitted. A thread 1802 for receiving the second locking screw 238 may be provided. A plate 1804 with a through hole may be provided between the second lens holder 222 and the second movement knob 228, and this plate 1804 may be connected with the housing of the head mounted display in which the optical system may be provided, for example at a location fixed with respect to the housing. The plate 1804 may be clamped between the second movement know 228 and the second lens holder 222, and thus may provide that the second optical system including the second lens holder 222 may be fixed or locked, once the second locking screw 238 is screwed into the thread 1802.

According to various embodiments, instead of pins like described in FIG. 2 for an adjustment of diopters (i.e. for a movement of the optical systems (for example the lens holders) in a direction at least substantially parallel to the optical axes of the optical systems, a rail system may be provided. For example, the second lens holder 222 may include a first rail portion 1810, which may engage with a second rail portion 1812, and may thus provide for a movement of the second lens holder 222 in a direction at least substantially parallel to the second optical axis. A stopper plate 1808 may be provided and may be attached to the second rail system 1812 using a screw 1806.

Figure 19:
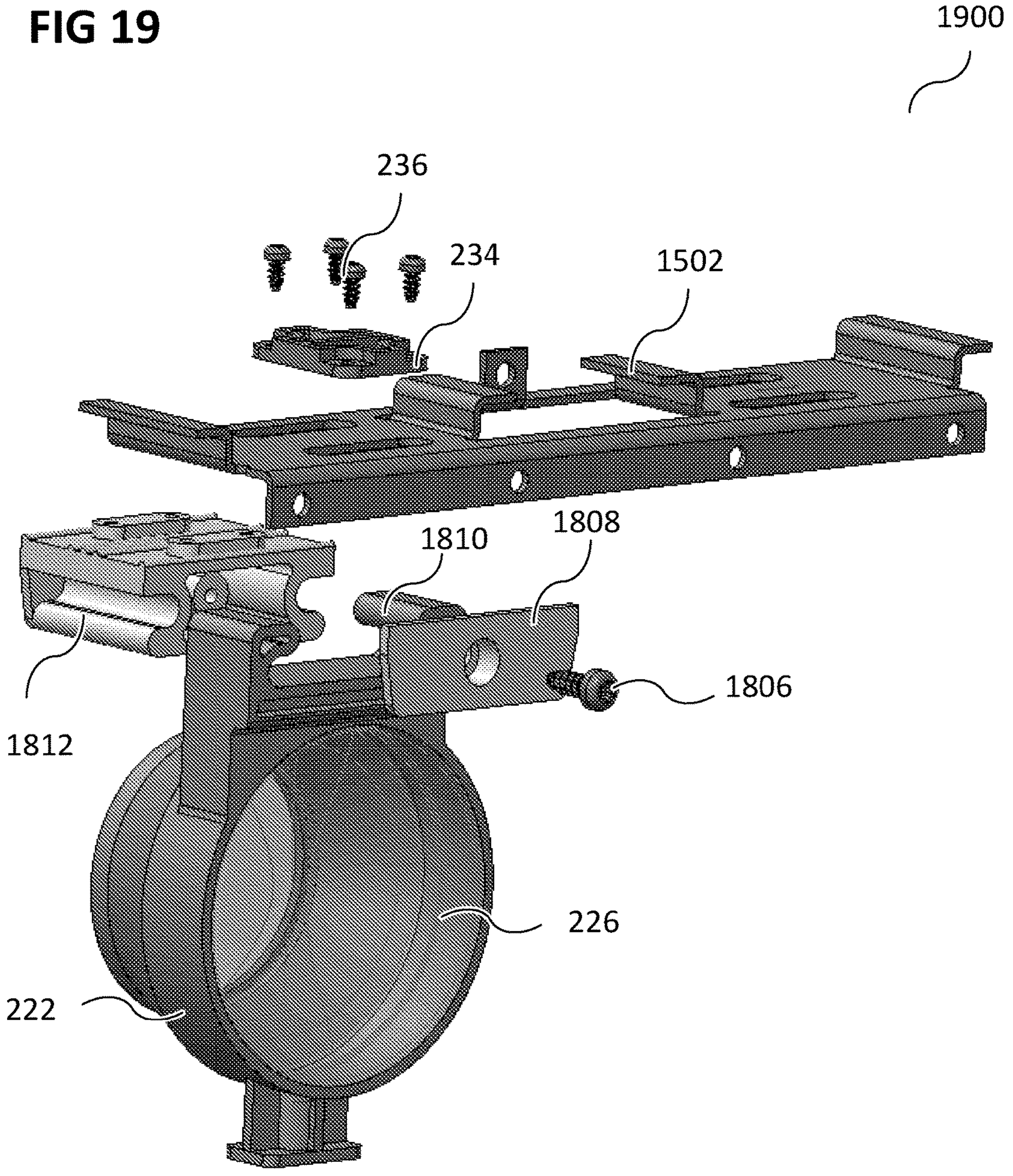

FIG. 19 shows an illustration 1900 of an exploded view of a portion of an optical system according to various embodiments. Various portions of the optical system shown in FIG. 19 may be similar or identical to portions of the optical system shown in FIG. 2, FIG. 15 or FIG. 18, so that the same reference signs may be used and duplicate description may be omitted.

Figure 20:
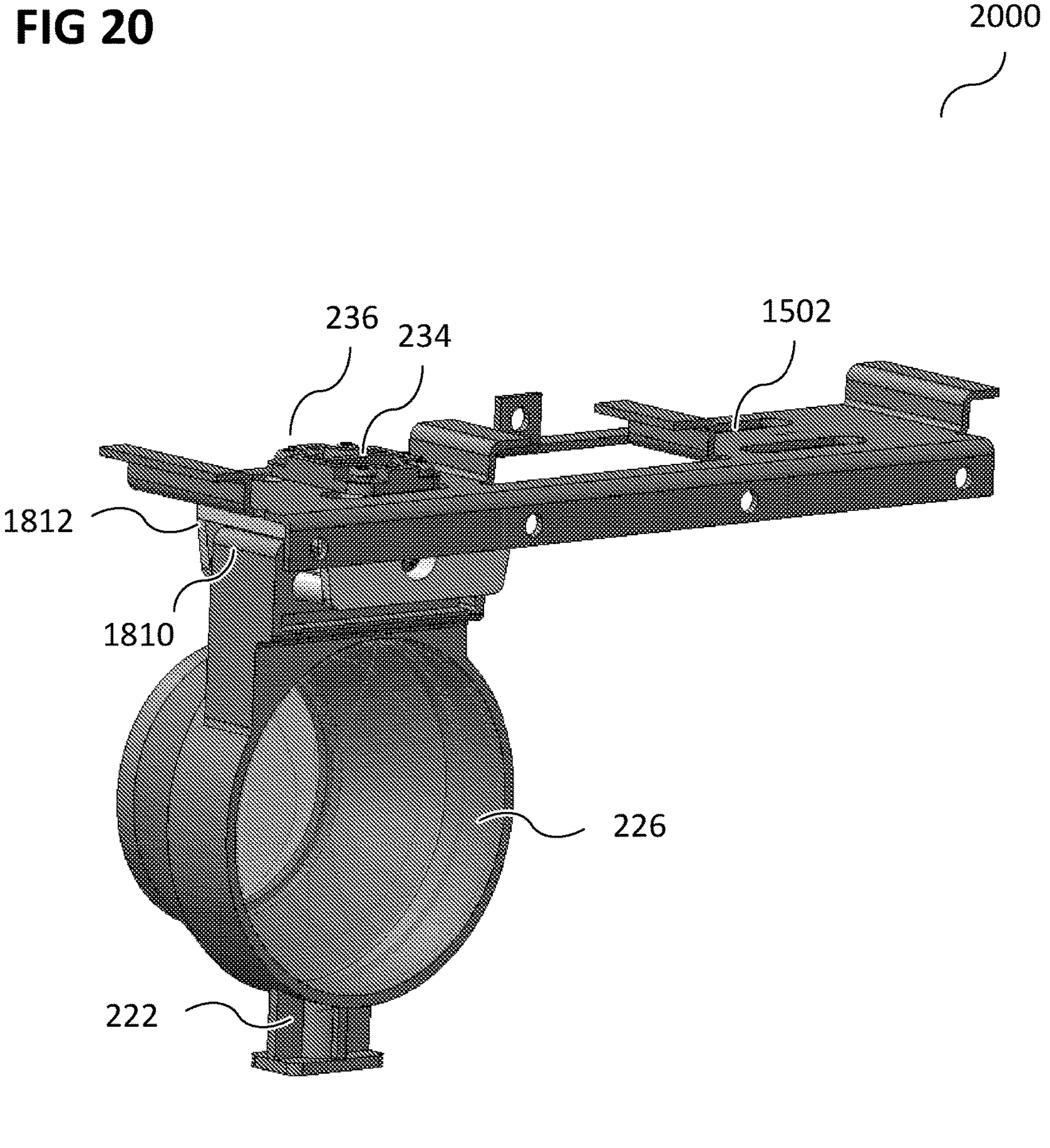

FIG. 20 shows an illustration 2000 of a perspective rear view of a portion of an optical system according to various embodiments. Various portions of the optical system shown in FIG. 20 may be similar or identical to portions of the optical system shown in FIG. 2, FIG. 15 or FIG. 18, so that the same reference signs may be used and duplicate description may be omitted.

Figure 21:
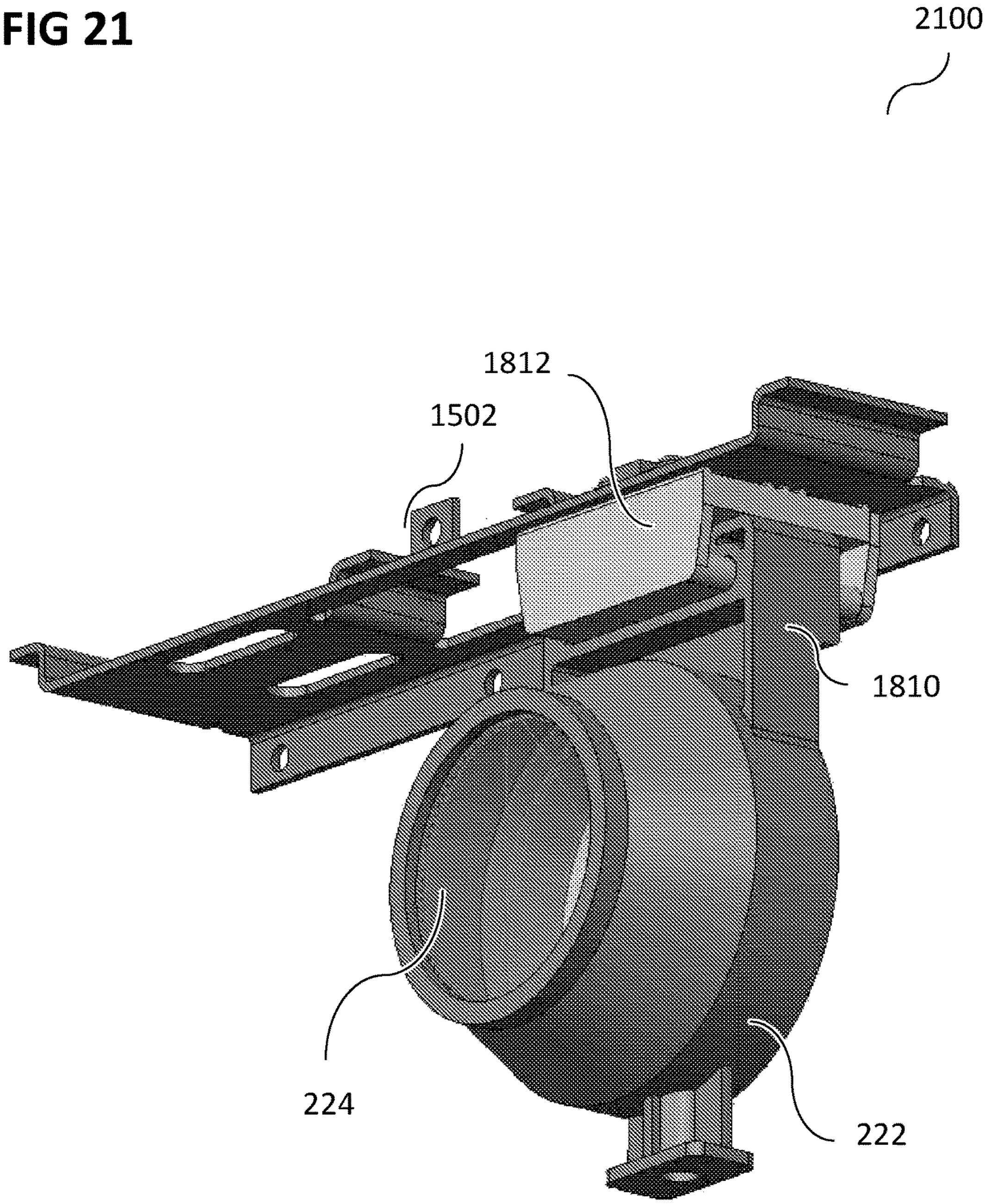

FIG. 21 shows an illustration 2100 of a perspective front view of a portion of an optical system according to various embodiments. Various portions of the optical system shown in FIG. 21 may be similar or identical to portions of the optical system shown in FIG. 2, FIG. 15 or FIG. 18, so that the same reference signs may be used and duplicate description may be omitted.

Figure 22:
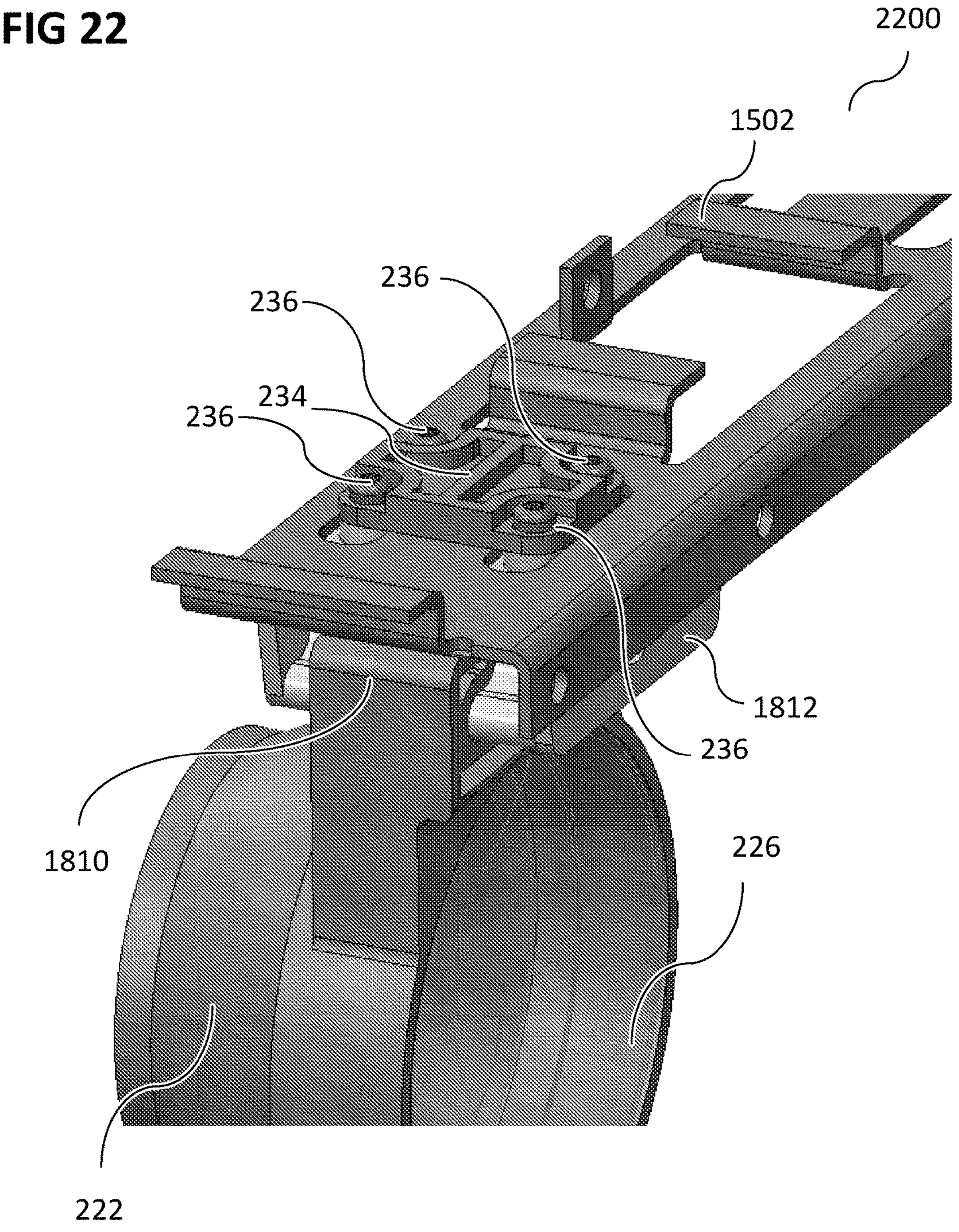

FIG. 22 shows an illustration 2200 of a perspective rear view of a portion of an optical system according to various embodiments. Various portions of the optical system shown in FIG. 22 may be similar or identical to portions of the optical system shown in FIG. 2, FIG. 15 or FIG. 18, so that the same reference signs may be used and duplicate description may be omitted.

Figure 23:
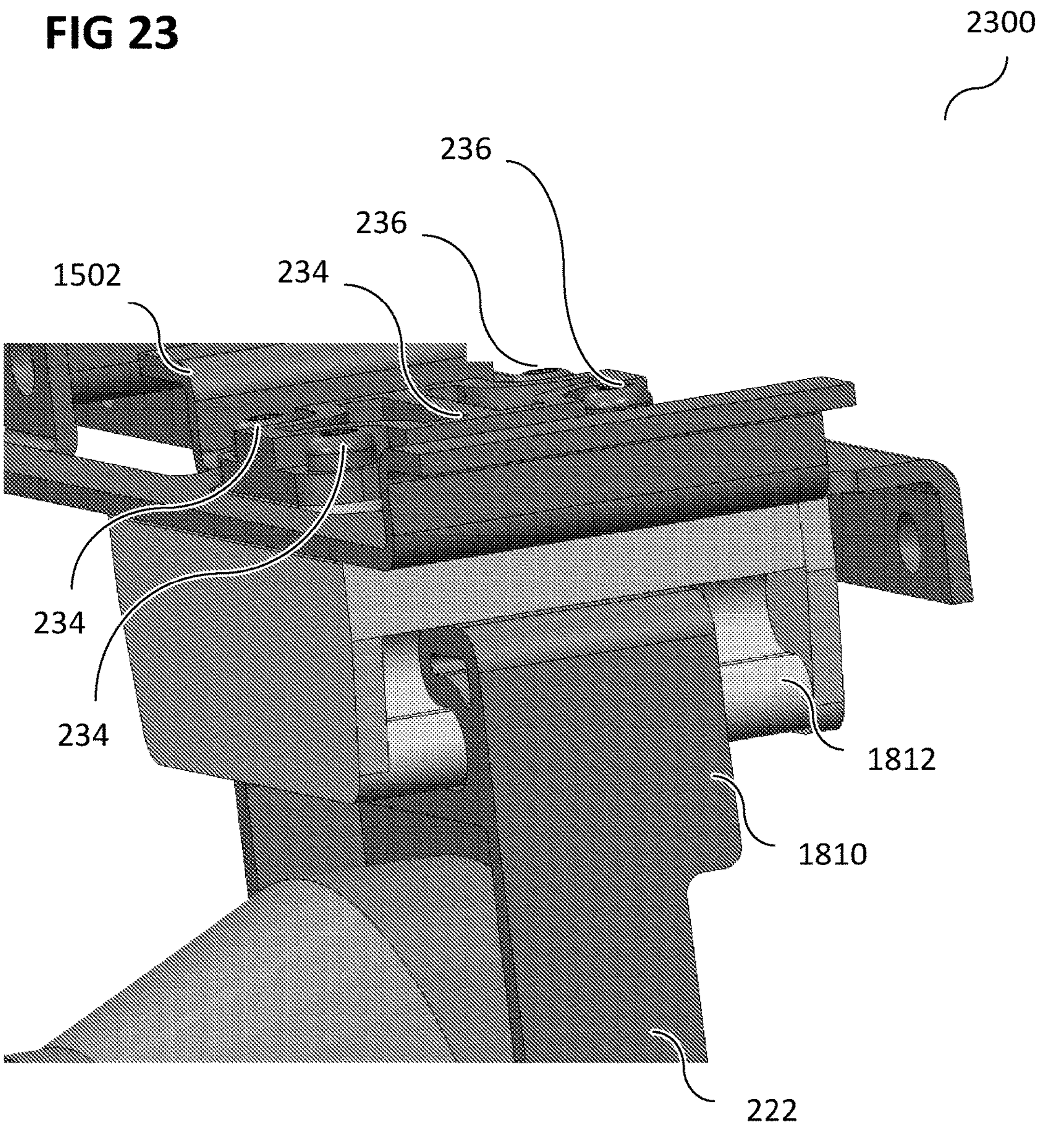

FIG. 23 shows an illustration 2300 of a perspective side view of a portion of an optical system according to various embodiments. Various portions of the optical system shown in FIG. 23 may be similar or identical to portions of the optical system shown in FIG. 2, FIG. 15 or FIG. 18, so that the same reference signs may be used and duplicate description may be omitted.

It will be understood that, although only a portion (for example only the second optical arrangement) is shown and described in some of the drawings, the other portion (for example the first optical arrangement) may have corresponding similar or same features or parts.

According to various embodiments, a HMD adjustable lens system may be provided.

According to various embodiments, a device may be provided for independent adjustment of optical modules (for example both left and right modules) mechanically to account for spacing between user's eyes and limitations of user's eyesight (such as myopia), for example in a head mounted display.

According to various embodiments, an adjustment assembly may be provided which allows for displacement of the optical module in two axes, including a movement knob for displacing the optical module longitudinally and laterally of the optical module. The optical module may be operably connected to the adjustment assembly which may be connected to the frame of the HMD. A knob may be located at the bottom of the optical module so that a user may access it and maneuver the knob for adjustment. A locking mechanism on the knob may be provided to lock the optical module in place.

According to various embodiments, an independent adjustment of the optical module may be provided to account for eyesight limitation and spacing of eyes of user. A knob for adjustment may be ergonomically located.

According to various embodiments, a visual method of providing set up of the IPD (interpupillary distance) and dioptries (or diopters) may be provided for the user for easy adjustment.

The following examples pertain to further embodiments.

Example 1 is an optical system comprising: a first optical arrangement comprising a first optical axis; a second optical arrangement comprising a second optical axis at least substantially parallel to the first optical axis; and a first movement member; wherein the first movement member is configured to move the first optical arrangement with respect to the second optical arrangement in a first direction and a second direction; wherein the first direction is a direction at least substantially parallel to the first optical axis; and wherein the second direction is a direction at least substantially perpendicular to the first optical axis.

In example 2, the subject-matter of example 1 can optionally include that the second direction is a direction at least substantially parallel to a distance between the first optical arrangement and the second optical arrangement.

In example 3, the subject-matter of any one of examples 1 to 2 can optionally include a connection member configured to connect with the first optical arrangement and with the second optical arrangement.

In example 4, the subject-matter of example 3 can optionally include that the first movement member is configured to move the first optical arrangement with respect to the connection member.

In example 5, the subject-matter of any one of examples 3 to 4 can optionally include a second movement member configured to move the second optical arrangement with respect to the first optical arrangement in the first direction and the second direction; wherein the second movement member is configured to move the second optical arrangement with respect to the connection member.

In example 6, the subject-matter of any one of examples 1 to 5 can optionally include that the first movement member comprises a first movement knob.

In example 7, the subject-matter of any one of examples 1 to 6 can optionally include a first locking member configured to lock a position of the first optical arrangement with respect to the second optical arrangement.

In example 8, the subject-matter of example 7 can optionally include that the first locking member is configured to lock an orientation of the first optical arrangement with respect to the second optical arrangement.

In example 9, the subject-matter of any one of examples 7 to 8 can optionally include a connection member configured to connect with the first optical arrangement and with the second optical arrangement; wherein the first locking member is configured to lock a position of the first optical arrangement with respect to the connection member.

In example 10, the subject-matter of example 9 can optionally include that the first locking member is configured to lock an orientation of the first optical arrangement with respect to the connection member.

In example 11, the subject-matter of any one of examples 1 to 10 can optionally include a second movement member configured to move the second optical arrangement with respect to the first optical arrangement in the first direction and the second direction.

In example 12, the subject-matter of example 11 can optionally include that the second movement member comprises a second movement knob.

In example 13, the subject-matter of any one of examples 1 to 12 can optionally include a second locking member configured to lock a position of the second optical arrangement with respect to the first optical arrangement.

In example 14, the subject-matter of example 13 can optionally include that the second locking member is configured to lock an orientation of the second optical arrangement with respect to the first optical arrangement.

In example 15, the subject-matter of example 14 can optionally include a connection member configured to connect with the first optical arrangement and with the second optical arrangement; wherein the second locking member is configured to lock a position of the second optical arrangement with respect to the connection member.

In example 16, the subject-matter of example 15 can optionally include that the second locking member is configured to lock an orientation of the second optical arrangement with respect to the connection member.

In example 17, the subject-matter of any one of examples 1 to 16 can optionally include that the first optical arrangement comprises a first lens arrangement.

In example 18, the subject-matter of any one of examples 1 to 17 can optionally include that the second optical arrangement comprises a second lens arrangement.

In example 19, the subject-matter of any one of examples 1 to 18 can optionally include that the first optical arrangement comprises a first display.

In example 20, the subject-matter of any one of examples 1 to 19 can optionally include that the second optical arrangement comprises a second display.

Example 21 is a head mounted display comprising: the optical system of any one of examples 1 to 20.

In example 22, the subject-matter of example 21 can optionally include a housing.

In example 23, the subject-matter of example 22 can optionally include that the housing comprises a connection member configured to connect with the first optical arrangement and with the second optical arrangement.

In example 24, the subject-matter of any one of examples 22 to 23 can optionally include a first locking member configured to lock at least one of a position of the first optical arrangement with respect to the housing or an orientation of the first optical arrangement with respect to the housing.

In example 25, the subject-matter of example 24 can optionally include that the first locking member is configured to engage with the housing via a hole in the housing.

In example 26, the subject-matter of example 25 can optionally include that the first locking member comprises an upper portion and a lower portion, wherein the upper portion of the first locking member has a diameter larger than a diameter of the hole; wherein the lower portion of the first locking member has a diameter larger than a diameter of the hole; and wherein the upper portion of the first locking member and the lower portion of the first locking member are connected via a screw.

In example 27, the subject-matter of any one of examples 22 to 26 can optionally include a second locking member configured to lock at least one of a position of the second optical arrangement with respect to the housing or an orientation of the second optical arrangement with respect to the housing.

In example 28, the subject-matter of any one of examples 24 to 26 can optionally include that the second locking member is configured to engage with the housing via a hole in the housing.

In example 29, the subject-matter of example 28 can optionally include that the second locking member comprises an upper portion and a lower portion, wherein the upper portion of the second locking member has a diameter larger than a diameter of the hole; wherein the lower portion of the second locking member has a diameter larger than a diameter of the hole; and wherein the upper portion of the second locking member and the lower portion of the second locking member are connected via a screw.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A head mounted display comprising:

an optical system comprising:

a first optical arrangement comprising a first optical axis;

a second optical arrangement comprising a second optical axis at least substantially parallel to the first optical axis;

a first movement member configured to move the first optical arrangement with respect to the second optical arrangement in a first direction and a second direction, wherein the first direction is a direction at least substantially parallel to the first optical axis, wherein the second direction is a direction at least substantially perpendicular to the first optical axis; and a second movement member configured to move the second optical arrangement with respect to the first optical arrangement in the first direction and the second direction, wherein the first optical arrangement and the second optical arrangement are moved independently from each other in the first direction and the second direction.

2. The head mounted display of claim 1, further comprising:

a housing.

3. The head mounted display of claim 2, wherein the housing comprises a connection member configured to connect with the first optical arrangement and with the second optical arrangement.

4. The head mounted display of claim 2, further comprising:

a first locking member configured to lock at least one of a position of the first optical arrangement with respect to the housing or an orientation of the first optical arrangement with respect to the housing.

5. The head mounted display of claim 2, further comprising:

a second locking member configured to lock at least one of a position of the second optical arrangement with respect to the housing or an orientation of the second optical arrangement with respect to the housing.

6. An optical system comprising:

a first optical arrangement comprising a first optical axis;

a second optical arrangement comprising a second optical axis at least substantially parallel to the first optical axis;

a first movement member configured to move the first optical arrangement with respect to the second optical arrangement in a first direction and a second direction, wherein the first direction is a direction at least substantially parallel to the first optical axis, wherein the second direction is a direction at least substantially perpendicular to the first optical axis; and a second movement member configured to move the second optical arrangement with respect to the first optical arrangement in the first direction and the second direction, wherein the first optical arrangement and the second optical arrangement are moved independently from each other in the first direction and the second direction.

7. The optical system of claim 6, wherein the second direction is a direction at least substantially parallel to a distance between the first optical arrangement and the second optical arrangement.

8. The optical system of claim 6, further comprising:

a connection member configured to connect with the first optical arrangement and with the second optical arrangement.

9. The optical system of claim 6, wherein the first movement member comprises a first movement knob.

10. The optical system of claim 6, further comprising:

a first locking member configured to lock a position of the first optical arrangement with respect to the second optical arrangement.

11. The optical system of claim 10, wherein the first locking member is configured to lock an orientation of the first optical arrangement with respect to the second optical arrangement.

12. The optical system of claim 10, further comprising:

a connection member configured to connect with the first optical arrangement and with the second optical arrangement;

wherein the first locking member is configured to lock a position of the first optical arrangement with respect to the connection member.

13. The optical system of claim 6, wherein the second movement member comprises a second movement knob.

14. The optical system of claim 6, further comprising:

a second locking member configured to lock a position of the second optical arrangement with respect to the first optical arrangement.

15. The optical system of claim 14, wherein the second locking member is configured to lock an orientation of the second optical arrangement with respect to the first optical arrangement.

16. The optical system of claim 6, wherein the first optical arrangement comprises a first lens arrangement.

17. The optical system of claim 6, wherein the second optical arrangement comprises a second lens arrangement.

18. The optical system of claim 6, wherein the first optical arrangement comprises a first display.

19. The optical system of claim 6, wherein the second optical arrangement comprises a second display.

* * * * *